(12) United States Patent  (10) Patent No.: US 9,183,320 B2
Ono et al.  (45) Date of Patent: Nov. 10, 2015

(54) DATA MANAGING METHOD, APPARATUS, AND RECORDING MEDIUM OF PROGRAM, AND SEARCHING METHOD, APPARATUS, AND MEDIUM OF PROGRAM

(75) Inventors: Toshirou Ono, Nishinomiya (JP); Masaki Nishigaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 13/591,876

(22) Filed: Aug. 22, 2012

(65) Prior Publication Data
US 2013/0060740 A1 Mar. 7, 2013

(30) Foreign Application Priority Data
Aug. 23, 2011 (JP) ................................. 2011-181326

(51) Int. Cl.
*G06F 17/30* (2006.01)
(52) U.S. Cl.
CPC ............................... *G06F 17/30911* (2013.01)
(58) Field of Classification Search
CPC .......... G06F 17/30067; G06F 17/3082; G06F 17/30911; G06F 17/30153
USPC .................... 707/693, 803; 709/247
See application file for complete search history.

(56) References Cited

U.S. PATENT DOCUMENTS

| 5,812,999 | A | * | 9/1998 | Tateno |
| 8,595,196 | B2 | * | 11/2013 | Kataoka et al. ............... 707/693 |
| 2005/0228811 | A1 | * | 10/2005 | Perry ........................... 707/101 |

FOREIGN PATENT DOCUMENTS

| JP | 04-274557 | 9/1992 |
| JP | 08-329116 | 12/1996 |
| JP | 10-275105 | 10/1998 |
| JP | 2001-067348 | 3/2001 |

OTHER PUBLICATIONS

Symfoware, "RDB Operation Guide of Symfoware Server V10.0.0," http://software.fujitsu.com/jp/manual/manualfiles/M100005/J2X17481/01Z200/J7481-00-02-02-01.html, Jun. 13, 2011, 11 pages.
Japanese Notification of Reasons for Refusal dated Jan. 6, 2015 in Japanese Application No. 2011-181326.

* cited by examiner

*Primary Examiner* — Monica Pyo
(74) *Attorney, Agent, or Firm* — Staas & Halsey LLP

(57) ABSTRACT

A data management apparatus includes a storage device; and a processor that executes a procedure, the procedure including selecting a data group, each data in the data group including one of a plurality of tags, among a plurality of data, compressing the data group into a compressed data group, and storing the compressed data group in the storage device, the stored compressed data group being associated with tagging information which indicates that each data of the data group includes the certain tag.

10 Claims, 49 Drawing Sheets

FIG. 4

| | | |
|---|---|---|
| 201101150101 | A | XML (BUSINESS CONDITIONS) |
| 201101150102 | A | XML (WORK ATTENDANCE INFORMATION) |
| 201101151001 | A | XML (SALES) |
| 201101160102 | A | XML (BUSINESS CONDITIONS) |
| 201101160102 | A | XML (SALES) |
| 201101160103 | A | XML (BUSINESS CONDITIONS) |

FIG. 5A

```
<DEPARTMENT>SALES AND MARKETING</DEPARTMENT>
<CONDITION>
  <NUMBER>13</NUMBER>
</CONDITION>
```

FIG. 5B

```
<DEPARTMENT>PERSONNEL</DEPARTMENT>
<APPLICATION>
  <WORK DAYS>20</WORK DAYS>
</APPLICATION>
```

FIG. 5C

```
<DEPARTMENT>SALES</DEPARTMENT>
<SALES>
  <PRODUCT>TV</PRODUCT>
  <PRICE>10000</PRICE>
  <NUMBER>1</NUMBER>
</SALES>
```

FIG. 6

| TAG ID | TAG NAME |
|---|---|
| 0 | DEPARTMENT |
| 1 | CONDITION |
| 2 | NUMBER |
| 3 | APPLICATION |
| 4 | WORK DAYS |
| 5 | SALES |
| 6 | PRODUCT |
| 7 | PRICE |

FIG. 8

| | | | | | | | |
|---|---|---|---|---|---|---|---|
| 1 | 1 | 1 | 1 | 0 | 0 | 0 | 0 |
| 1 | 0 | 0 | 0 | 0 | 0 | 0 | 0 |
| 1 | 0 | 1 | 1 | 0 | 1 | 0 | 0 |
| 1 | 1 | 0 | 0 | 1 | 0 | 1 | 1 |
| 1 | 0 | 1 | 0 | 0 | 0 | 0 | 0 |
| 1 | 1 | 1 | 0 | 0 | 1 | 1 | 1 |
| 1 | 1 | 1 | 0 | 0 | 0 | 0 | 0 |

| | | |
|---|---|---|
| 201101150101 | A | XML (BUSINESS CONDITIONS) |
| 201101150102 | A | XML (WORK ATTENDANCE INFORMATION) |
| 201101151001 | A | XML (SALES) |
| 201101160102 | A | XML (BUSINESS CONDITIONS) |
| 201101160102 | A | XML (SALES) |
| 201101160103 | A | XML (BUSINESS CONDITIONS) |

FIG. 10

| 1 | 0 | 0 | 1 | 1 | 0 | 0 | 0 | Blk1 ptr |          |
|---|---|---|---|---|---|---|---|----------|----------|
| 1 | 0 | 1 | 0 | 0 | 1 | 1 | 1 | Blk2 ptr |          |
| 1 | 1 | 1 | 0 | 0 | 0 | 0 | 0 | Blk3 ptr | Blk4 ptr |

FIG. 21

| TAG BIT MAP | BlkPtrCnt (1) | Blk1 Ptr ||||
|---|---|---|---|---|---|
| | | FILE ID | BLOCK OFFSET | | |
| TAG BIT MAP | BlkPtrCnt (2) | Blk2 Ptr || Blk3 Ptr ||
| | | FILE ID | BLOCK OFFSET | FILE ID | BLOCK OFFSET |

FIG. 23

| TAG CONVERSION TABLE | | | | | |
|---|---|---|---|---|---|
| | | Blk1 Ptr | | | |
| TagBmp | BlkPrtCnt (1) | FILE ID | BLOCK OFFSET | | |
| | | Blk2 Ptr | | Blk3 Ptr | |
| TagBmp | BlkPrtCnt (2) | FILE ID | BLOCK OFFSET | FILE ID | BLOCK OFFSET |

FIG. 28

| | TAG CONVERSION WORK TABLE FOR JUNE 2011 |
|---|---|
| 0 | CONDITION |
| 1 | NUMBER |
| 2 | (EMPTY) |
| 3 | DEPARTMENT |
| 4 | (EMPTY) |
| 5 | SALES |
| 6 | PRODUCT |
| 7 | PRICE |

FIG. 29

| TAG CONVERSION TABLE FOR JUNE 2011 ||||
|---|---|---|---|
| TAG IDa | TAG IDb | TAG NAME | REFERENCE COUNT |
| 0 | 0 | CONDITION | 0 |
| 1 | 1 | NUMBER | 0 |
| 2 | 3 | DEPARTMENT | 0 |
| 3 | 5 | SALES | 0 |
| 4 | 6 | PRODUCT | 0 |
| 5 | 7 | PRICE | 0 |

FIG. 32

| 0 | 0 | 1 | 1 | 1 | 0 | 0 | 0 | 0 | Blk1 ptr | |
|---|---|---|---|---|---|---|---|---|----------|---|
| 1 | 1 | 0 | 1 | 0 | 0 | 0 | 0 | 0 | Blk2 ptr | |
| 1 | 1 | 0 | 1 | 0 | 0 | 1 | 1 | 1 | Blk2 ptr | Blk3 ptr |

FIG. 33

| TAG CONVERSION WORK TABLE ||
|---|---|
| TAG ID | TAG NAME |
| 0 | CONDITION |
| 1 | NUMBER |
| 2 | APPLICATION |
| 3 | DEPARTMENT |
| 4 | WORK DAYS |
| 5 | (EMPTY) |
| 6 | SALES |
| 7 | PRODUCT |
| 8 | PRICE |

| TAG CONVERSION TABLE ||||
|---|---|---|---|
| TAG IDa | TAG IDb | TAG NAME | REFERENCE COUNT |
| 0 | 0 | CONDITION | 0 |
| 1 | 1 | NUMBER | 0 |
| 2 | 2 | APPLICATION | 0 |
| 3 | 3 | DEPARTMENT | 0 |
| 4 | 4 | WORK DAYS | 0 |
| 5 | 6 | SALES | 0 |
| 6 | 7 | PRODUCT | 0 |
| 7 | 8 | PRICE | 0 |

FIG. 34

| 0 | 0 | 1 | 1 | 1 | 0 | 0 | 0 | 0 | Blk1 ptr |          |
|---|---|---|---|---|---|---|---|---|----------|----------|
| 1 | 1 | 0 | 1 | 0 | 0 | 0 | 0 | 0 | Blk2 ptr |          |
| 1 | 1 | 0 | 1 | 0 | 0 | 1 | 1 | 1 | Blk2 ptr | Blk3 ptr |

| 0 | 0 | 1 | 1 | 1 | 0 | 0 | 0 | Blk1 ptr |          |
|---|---|---|---|---|---|---|---|----------|----------|
| 1 | 1 | 0 | 1 | 0 | 0 | 0 | 0 | Blk2 ptr |          |
| 1 | 1 | 0 | 1 | 0 | 1 | 1 | 1 | Blk2 ptr | Blk3 ptr |

DATA MANAGING METHOD, APPARATUS, AND RECORDING MEDIUM OF PROGRAM, AND SEARCHING METHOD, APPARATUS, AND MEDIUM OF PROGRAM

CROSS-REFERENCE TO RELATED APPLICATIONS

This application is based upon and claims the benefit of priority of the prior Japanese Patent Application No. 2011-181326, filed on Aug. 23, 2011, the entire contents of which are incorporated herein by reference.

FIELD

The embodiments discussed herein are related to searching and management of a database.

BACKGROUND

Data warehousing involving the collection of large numbers of business reports is conducted in order to increase the transparency of corporate activity over long periods. Such data warehouses generally have characteristics like the following. Although the access reference is low, large amounts of data are saved for long periods. Also, since data is stored over long periods, reports and other information are stored in a general format (such as XML (eXtensible Markup Language), for example) able to cope with changes of application due to changes in business practices. Furthermore, endeavors to reduce costs are made by utilizing a relational database (RDB) as a long-term asset.

For this reason, it is typical to store XML documents directly as columns in an RDB as assumed by design, and the resulting increases in data search costs (performance problems, for example) and investment costs of disks for large-volume data storage are becoming significant. Formats that conform to Information Lifecycle Management (ILM) considerations are also becoming typical data layout structures.

In contrast, regarding the performance problems mentioned above, there exists technology that localizes records to be accessed in a database management system by adding an index with an XML-like structure (such as creating an index that stores XML document paths and their values, for example). As a separate approach, there also exists technology that, although searching all records, uses parallel processing to speed up overall performance.

The above-described technique of identifying target records by adding an index with an XML-like document structure is an adaption of existing ideas about RDB index structures to XML. However, with long-term data storage, there is a possibility that design changes may occur in order for the XML document structure (report format) to keep pace with changes in business practices, thus increasing costs.

In addition, the technique that performs parallel searches is a method that yields performance advantages by splitting information across disks, which incurs the usage of extra resources. Moreover, partitioning to split up data in order to yield parallel performance gains involves designing how to level access across disks for long-term data management, and is burdensome from a cost perspective.

SUMMARY

According to an aspect of the invention, a data management apparatus includes a storage device; and a processor that executes a procedure, the procedure including selecting a data group, each data in the data group including one of a plurality of tags, among a plurality of data, compressing the data group into a compressed data group, and storing the compressed data group in the storage device, the stored compressed data group being associated with tagging information which indicates that each data of the data group includes the certain tag.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates exemplary data stored in a first DB.

FIG. 5A illustrates exemplary report data expressing business conditions.

FIG. 5B illustrates exemplary report data expressing work attendance information.

FIG. 5C illustrates exemplary report data expressing sales data.

FIG. 6 illustrates an exemplary tag conversion table.

FIG. 8 schematically illustrates an example of processing according to a first embodiment.

FIG. 10 illustrates an exemplary tag judge.

FIG. 21 illustrates an exemplary tag judge data structure.

FIG. 23 illustrates exemplary data stored in a second DB.

FIG. 28 illustrates an exemplary tag conversion work table according to a second embodiment.

FIG. 29 illustrates an exemplary tag conversion table according to a second embodiment.

FIG. 32 schematically illustrates an example of processing according to a second embodiment.

FIG. 33 schematically illustrates an example of processing according to a second embodiment.

FIG. 34 schematically illustrates an example of processing according to a second embodiment.

DESCRIPTION OF EMBODIMENTS

Figure 1:
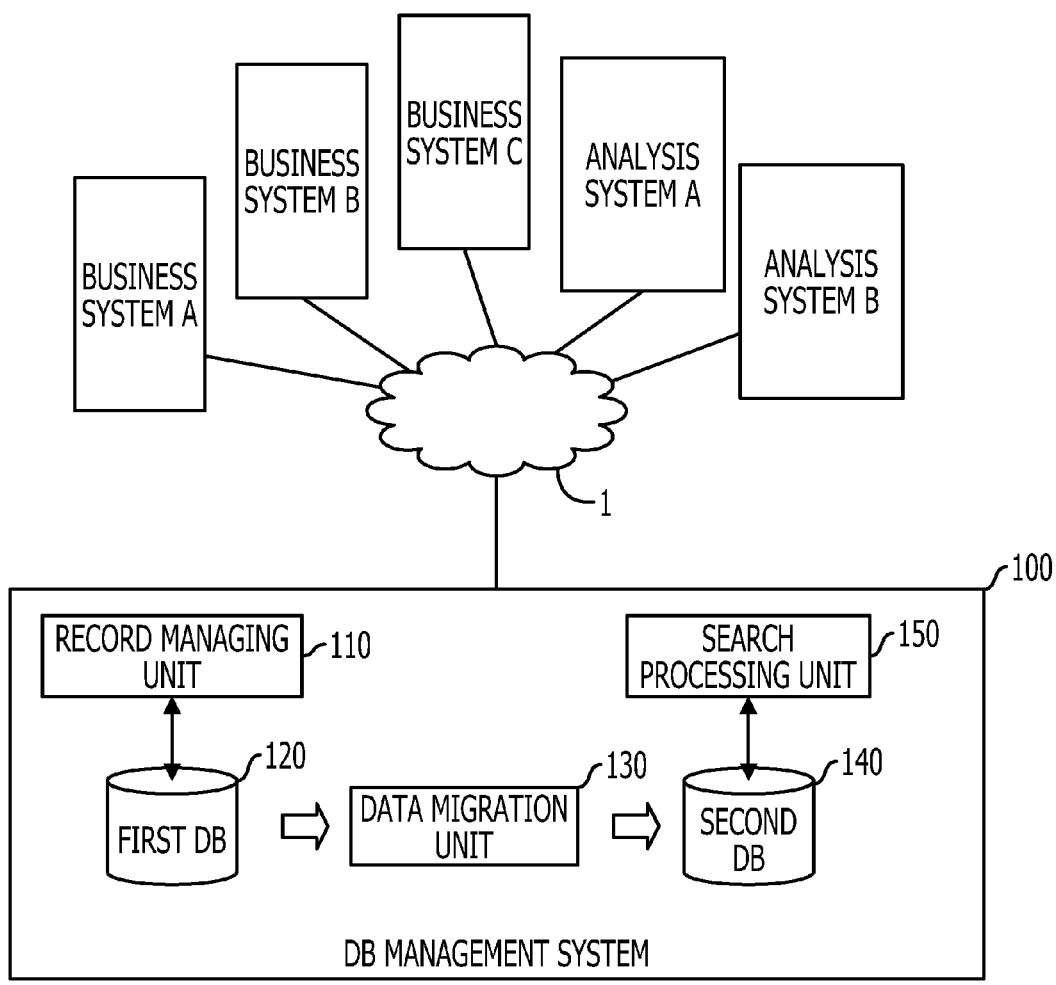
FIG. 1 illustrates an example of a configuration of a system.

An overview of a system according to a first embodiment of the present technology will be described using FIG. 1. A plurality of business systems (business systems A to C in FIG. 1), a plurality of analysis systems (analysis systems A and B in FIG. 1), and a DB management system 100 that carries out principal processing in the present embodiment are connected to a network 1, which may be a corporate intranet, for example. The business systems A to C generate report data in the form of XML document data, for example, and register or refer to such report data in the DB management system 100. The analysis systems A and B carry out processing that analyzes report data registered in the DB management system 100. The DB management system 100 includes one or more computers.

The DB management system 100 includes a record managing unit 110, a first database (DB) 120, a data migration unit 130, a second DB 140, and a search processing unit 150. The record managing unit 110 stores report data transmitted from the business systems A to C in the first DB 120. The first DB 120 stores report data generated in an immediate given interval, such as in the last day, in the last week, or in the last month, for example. Typically, the data migration unit 130 stores report data in the first DB 120 in the order in which reports are produced. Also, the data migration unit 130 carries out processing for collecting a given period's worth of report data stored in the first DB 120, such as one day, one week, or one month of report data, and storing the collected report data in the second DB 140. The search processing unit 150 receives search queries from the analysis systems A and B, for example, carries out processing corresponding to the search queries on the second DB 140, and replies to the querying analysis system with the search results. In the second DB 140, data is accumulated in units of a given period, such as units of one day, one week, or one month.

Figure 2:
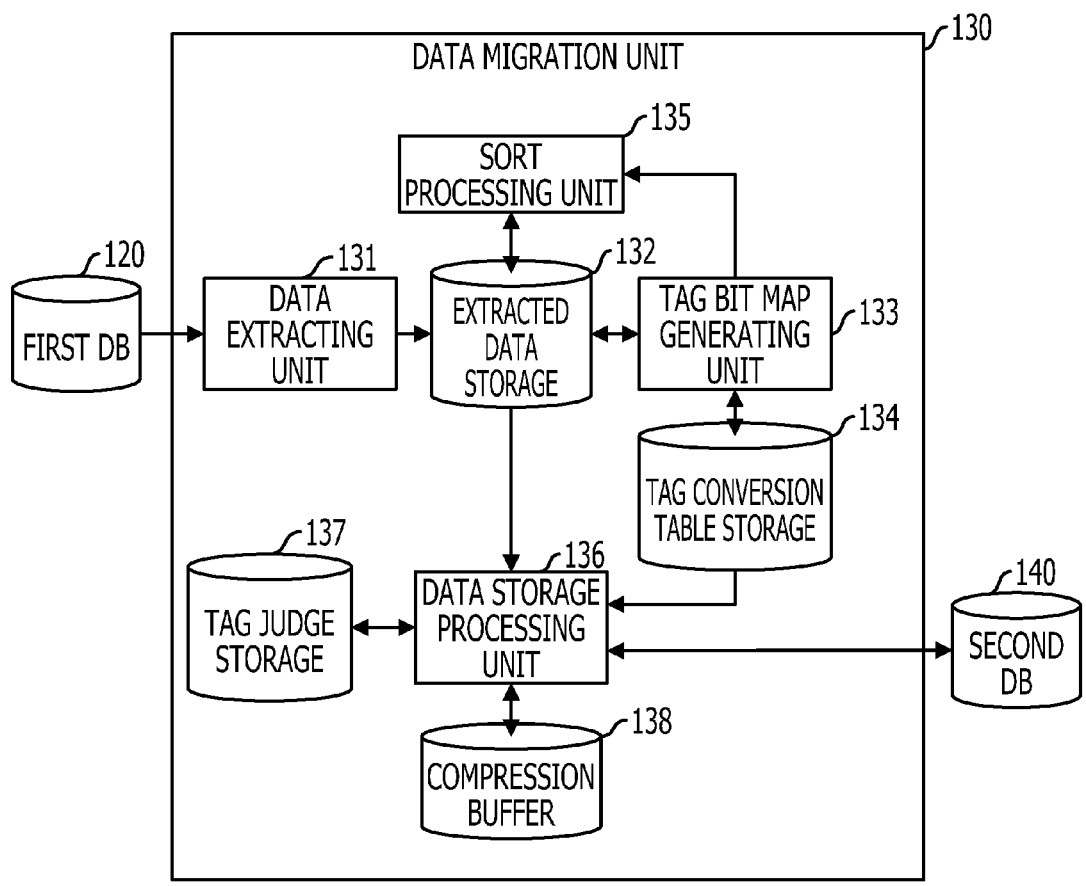
FIG. 2 illustrates an example of function blocks of a data migration unit according to a first embodiment.

FIG. 2 illustrates a function block diagram of the data migration unit 130. The data migration unit 130 includes a data extracting unit 131, extracted data storage 132, a tag bit map generating unit 133, tag conversion table storage 134, a sorting unit 135, a data storage processing unit 136, tag judge storage 137, and a compression buffer 138.

The data extracting unit 131 extracts data records from the first DB 120 to be stored in the second DB 140, and stores the extracted data records in the extracted data storage 132. The tag bit map generating unit 133 generates a tag conversion table from data stored in the extracted data storage 132, stores the generated tag conversion table in the tag conversion table storage 134, generates tag bit maps (tag bit maps), concatenates the generated tag bit maps with the data records, and stores the results in the extracted data storage 132. The sorting unit 135 sorts records with an included tag bit map by their tag bit maps, and stores the sorted results in the extracted data storage 132.

The data storage processing unit 136 generates a tag judge (TagJudge) according to sorted results stored in the extracted data storage 132. The tag judge is index data used for searching, and is stored in the tag judge storage 137. The data storage processing unit 136 also buffers records being processed in the compression buffer 138. In addition, the data storage processing unit 136 takes compressed data, tag judge data being stored in the tag judge storage 137, and data being stored in the tag conversion table storage 134, and stores the above data in the second DB 140.

Figure 3:
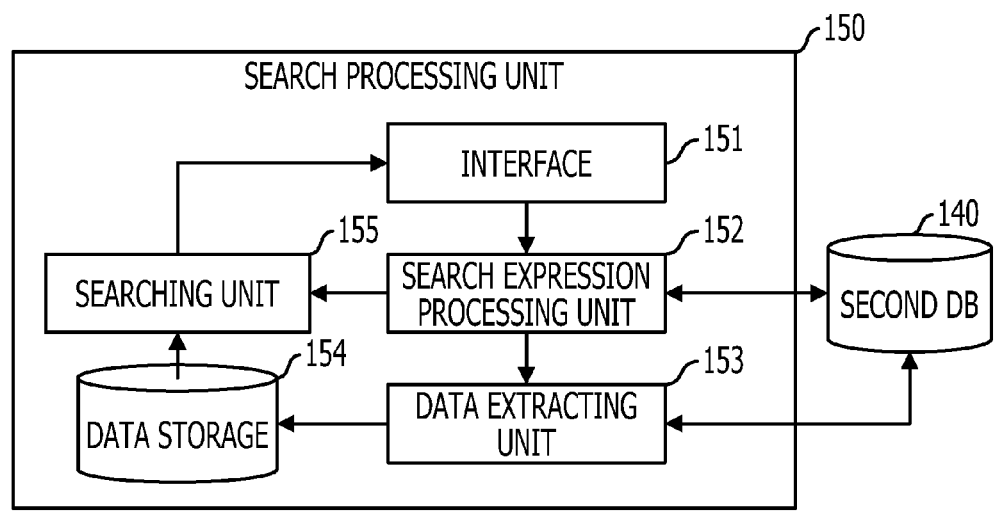
FIG. 3 illustrates an example of function blocks of a search processing unit according to a first embodiment.

FIG. 3 illustrates a function block diagram of the search processing unit 150. The search processing unit 150 includes an interface 151, a search expression processing unit 152, a data extracting unit 153, data storage 154, and a searching unit 155.

The interface 151 receives a search query from an analysis system or other source, and then outputs the search expression included in the search query to the search expression processing unit 152. The search expression processing unit 152 generates a bit map associated with the search expression from the tag conversion table stored in the second DB 140, and outputs the generated bit map to the data extracting unit 153. The data extracting unit 153 identifies corresponding compressed data from the bit map generated by the search expression processing unit 152 and the tag judge stored in the second DB 140, reads out the corresponding compressed data from the second DB 140 and decompresses it, and stores the decompressed data in the data storage 154. Additionally, the search expression processing unit 152 converts the search expression on the basis of the tag conversion table stored in the second DB 140 to obtain a search expression in the tag ID format included in the tag conversion table, and outputs the converted search expression to the searching unit 155. The searching unit 155 searches records (including report data) stored in the data storage 154 with the converted search expression, and outputs matching report data to the interface 151. The interface 151 transmits the matching report data to the querying analysis system or other apparatus.

Next, an overview of processing according to the first embodiment will be described using FIGS. 4 to 25. As an example, data like that illustrated in FIG. 4 is stored in the first DB 120. In the example in FIG. 4, data is registered with a date in a first column ("201101150101", for example), attribute data in a second column ("A" in FIG. 4), and report data in a third column (XML document data in this case). The report data includes data on business conditions, work attendance information, and sales data, for example. In this way, one XML document data block is registered as one data record.

FIG. 5A illustrates exemplary report data expressing business conditions, which in this example includes a department tag, a condition tag, and a number tag. FIG. 5B illustrates exemplary work attendance information, which in this example includes a department tag, an application tag, and a work days tag. FIG. 5C illustrates exemplary report data on sales data, which in this example includes a department tag, a sales tag, a product tag, a price tag, and a number tag.

In the case of storing such data in the second DB 140, as the data is processed a tag conversion table like that illustrated by example in FIG. 6 is generated every time a new type of tag appears. In the example in FIG. 6, tag identification numbers (called tag IDs) and tag names are registered in association with each other in the tag conversion table.

Figure 7:
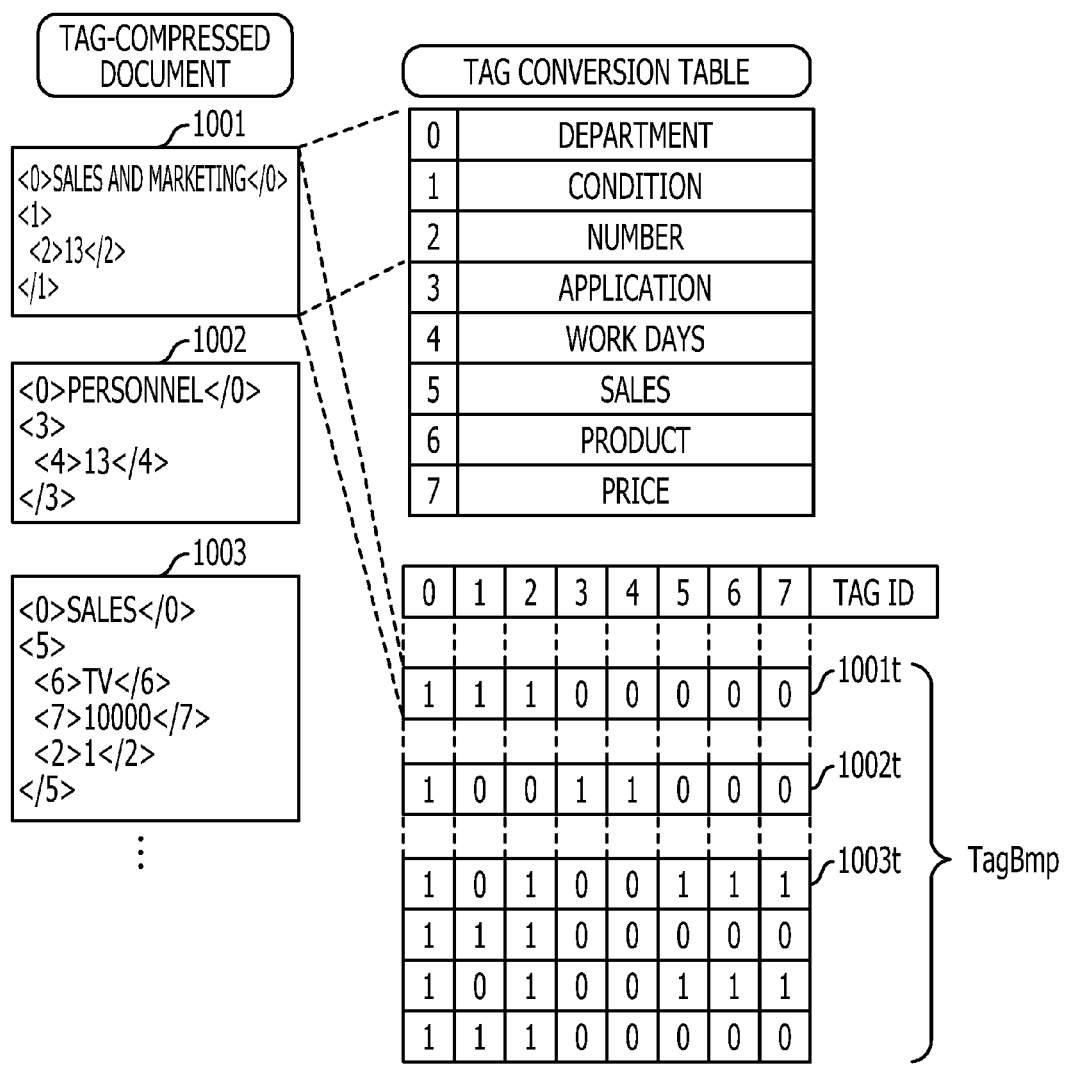
FIG. 7 schematically illustrates an example of processing according to a first embodiment.

Additionally, processing like that schematically illustrated in FIG. 7 is carried out. Namely, a tag compression process is performed on the tag conversion table. In the tag compression process, tag strings are replaced by their tag IDs, and tag-compressed documents (also called tag-compressed report data) are generated. For example, the report data in FIG. 5A is converted into a tag-compressed document 1001. The department tag is replaced with the tag ID "0", the condition tag with the tag ID "1", and the number tag with the tag ID "2". The report data in FIG. 5B is converted into a tag-compressed document 1002. The department tag is replaced with the tag ID "0", the application tag with the tag ID "3", and the work days tag with the tag ID "4". The report data in FIG. 5C is converted into a tag-compressed document 1003. The department tag is replaced with the tag ID "0", the number tag with the tag ID "2", the sales tag with the tag ID "5", the product tag with the tag ID "6", and the price tag with the tag ID "7".

Then, a tag bit map (TagBmp) is generated for each tag-compressed document (or in other words, for each report data block). Specifically, tag IDs correspond to bit positions in the tag bit map, with the tag ID "0" associated with the 0th bit position, the tag ID "1" with the 1st bit position, the tag ID "2" with the 2nd bit position, and so on. Herein, lower tag IDs become higher-order bits in the tag bit map.

Since the tag-compressed document 1001 includes tags with the tag IDs "0", "1", and "2", the 0th, 1st, and 2nd bit positions in the tag bit map are set to the value 1, while all other bit positions are set to the value 0. In other words, a tag bit map 1001t is generated. Similarly, since the tag-compressed document 1002 includes tags with the tag IDs "0", "3", and "4", the 0th, 3rd, and 4th bit positions in the tag bit map are set to the value 1, while all other bit positions are set to the value 0. In other words, a tag bit map 1002t is generated. Furthermore, since the tag-compressed document 1003 includes tags with the tag IDs "0", "2", "5", "6", and "7", the 0th, 2nd, 5th, 6th, and 7th bit positions in the tag bit map are set to the value 1, while all other bit positions are set to the value 0. In other words, a tag bit map 1003t is generated.

FIG. 7 also illustrates tag bit maps for other report data blocks (tag-compressed documents). A tag bit map is generated for all report data blocks.

Figure 9:
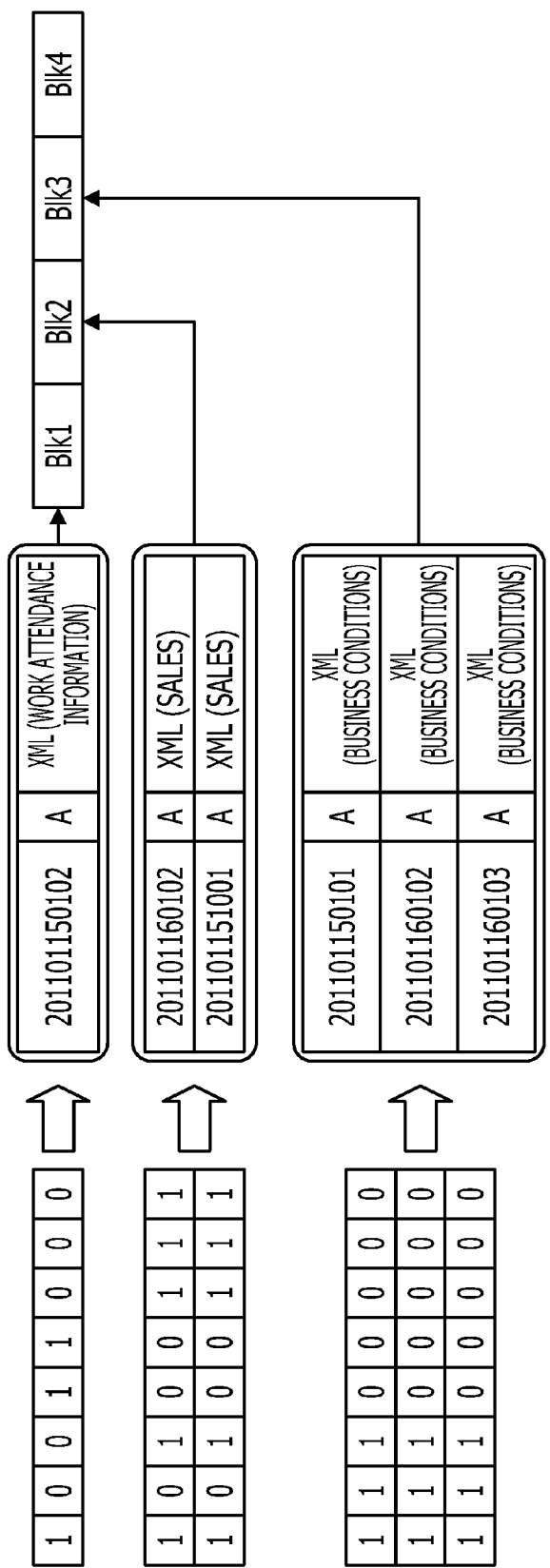
FIG. 9 illustrates an example of the storage of data in a second DB according to a first embodiment.

Tag bit maps generated in this way are concatenated with data records extracted from the first DB 120 and sorted using the tag bit map portion as a sort key, as illustrated in FIG. 8. In the case of processing six records as illustrated in FIG. 8, the records are sorted as illustrated in FIG. 9. In addition, in the present embodiment, relevant record data is compressed for individual tag bit map types. In other words, the data from one or more records yielding the same tag bit map is compressed together to generate a compressed block, which is stored in the second DB 140. In the example in FIG. 9, there is one record from which the tag bit map "10011000" was generated. The data from this record is compressed to generate a compressed block Blk1, which is stored in a given location in the second DB 140. Also, there are two records from which the tag bit map "10100111" was generated. The data from these records is compressed together to generate a compressed block Blk2, which is stored in a given location in the second DB 140. Also, there are three records from which the tag bit map "11100000" was generated. The data from these records is compressed together to generate compressed blocks Blk3 and Blk4, which are stored in a given location in the second DB 140. Note that two or more compressed blocks may be generated for a record group yielding the same tag bit map in the case where an upper limit on the compressed block size is set. It is also assumed that record groups extracted together from the first DB 120 are stored in the same partition, etc. of the second DB 140.

Additionally, a tag judge (TagJudge) that acts as a document structure index is also generated in order to handle search queries from analysis systems or other sources. In this example, a tag judge like that illustrated in FIG. 10 is generated. Specifically, pointers to corresponding compressed blocks are registered for individual tag bit map types. In this example, a pointer ptr to the compressed block Blk1 is registered for the tag bit map "10011000", a pointer to the compressed block Blk2 is registered for the tag bit map "10100111", and pointers to the compressed blocks Blk3 and Blk4 are registered for the tag bit map "11100000".

The tag conversion table illustrated in FIG. 6 and the tag judge illustrated in FIG. 10 are registered in the second DB 140 and used in a search process conducted by the search processing unit 150.

Since a tag conversion table and a tag judge are automatically generated by carrying out such processing, it becomes possible to avoid manual design modifications due to changes in reports brought about by changes in business practices. Furthermore, by clustering report data blocks according to a tag bit map, one can expect to compress report data blocks of the same type together. In other words, a high compression ratio is anticipated, and data archival costs (i.e., hardware costs) can be reduced.

Figure 11:
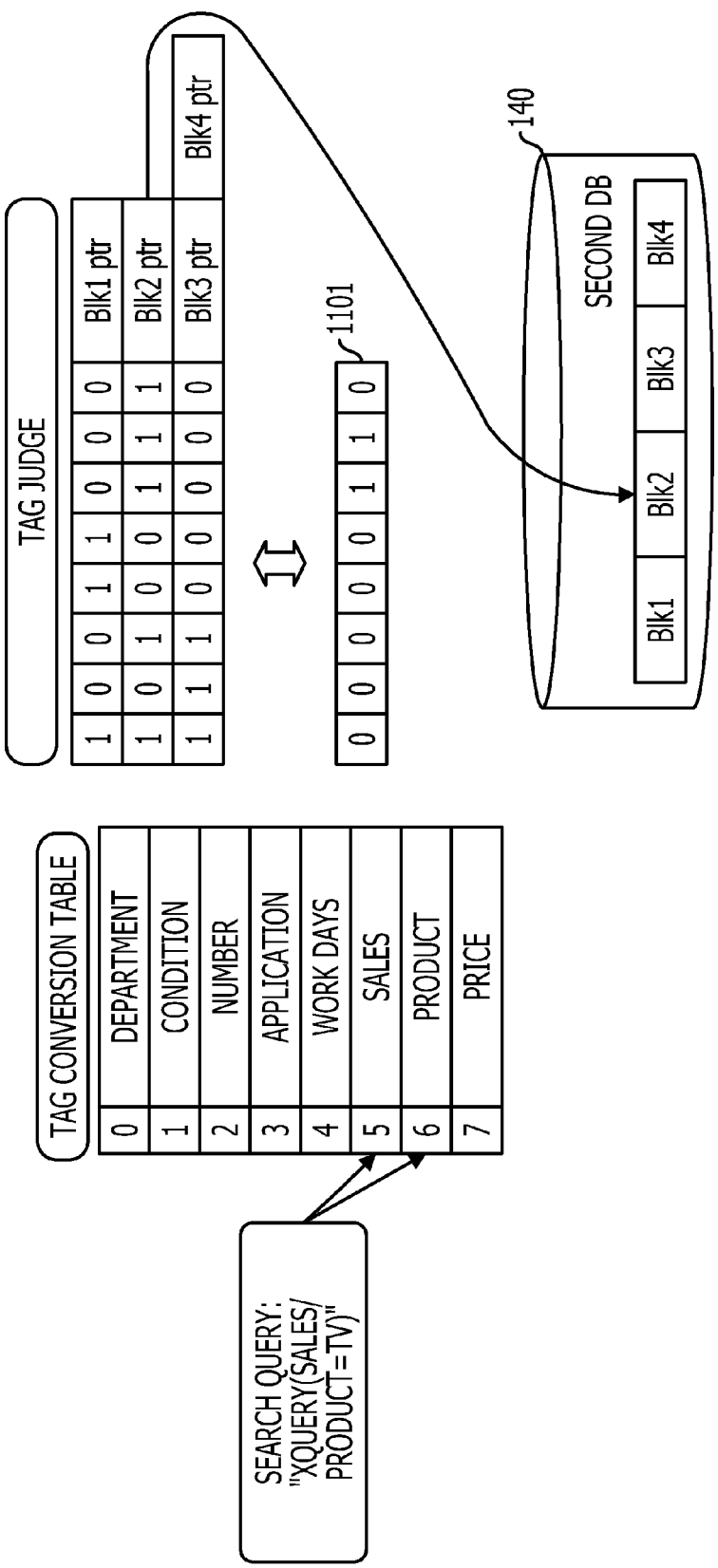
FIG. 11 schematically illustrates an example of a search process according to a first embodiment.

Next, an overview of processing during search will be described using FIGS. 11 and 12. As an example, the case of receiving a search query that contains the search expression "XQUERY(sales/product=TV)" will be described. Specifically, a search query requesting the extraction of report data blocks containing data on TVs in a sales tag or a product tag.

Consequently, corresponding tag IDs for the parameters "sales" and "product" contained in the search expression are read out from the tag conversion table. In this example, "5" and "6" are specified. Thus, a search expression bit map 1101 is generated with the 5th and 6th bit positions set to the value 1. In the example in FIG. 11, "00000110" is obtained. Then, a bitwise AND operation is performed on this search expression bit map 1101 and the tag bit maps included in each of the records in the tag judge. Records in the tag judge for which the value 1 was produced at either bit position are specified. In this example, the second record has the value 1 set at the 5th and 6th bit positions, and this record is specified. Thus, since a pointer ptr to the corresponding compressed block Blk2 is obtained, the compressed block Blk2 being stored in the second DB 140 is read out.

Figure 12:
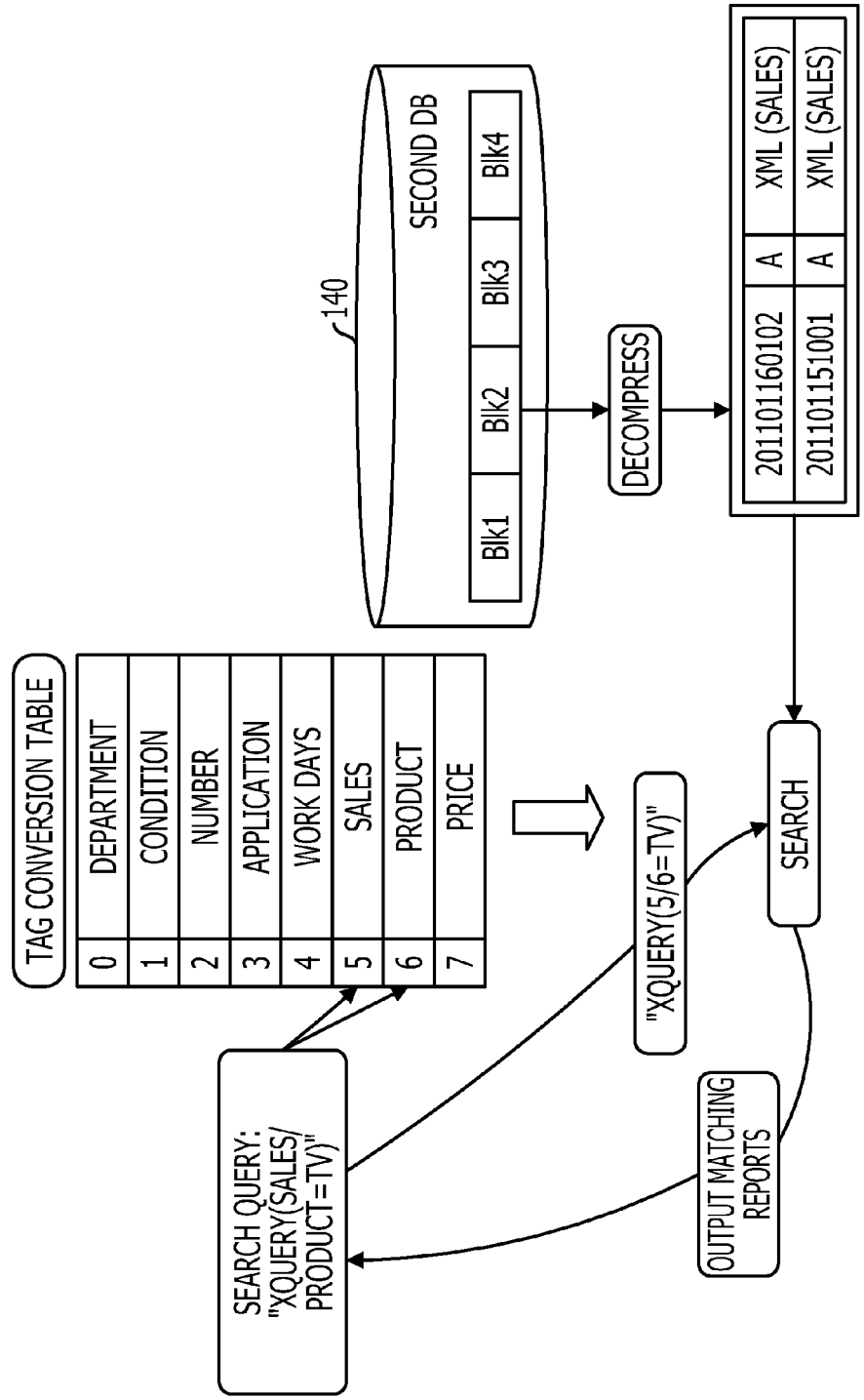
FIG. 12 schematically illustrates an example of a search process according to a first embodiment.

Next, the compressed block Blk2 is decompressed and the original data records are restored, as illustrated in FIG. 12. Note that since tags are compressed inside the report data block, the search expression is also tag-compressed before carrying out the search process. In other words, the tag conversion table is used to convert the search expression into "XQUERY(5/6=TV)", and a search process is conducted on the decompressed data records. In the case where report data blocks matching the parameters of the search process exist, the matching report data blocks are output.

In this way, the scope of compressed blocks to decompress is localized by the tag judge, thus reducing computational costs during a search. Additionally, it is possible to avoid designs that involve installing multiple disk devices or distributing data over such multiple disk devices in order to speed up performance with parallel access.

Next, specific processing details will be described using FIGS. 13 to 25. First, a process of storing data in the second DB 140 will be described using FIGS. 13 to 23.

Figure 13:
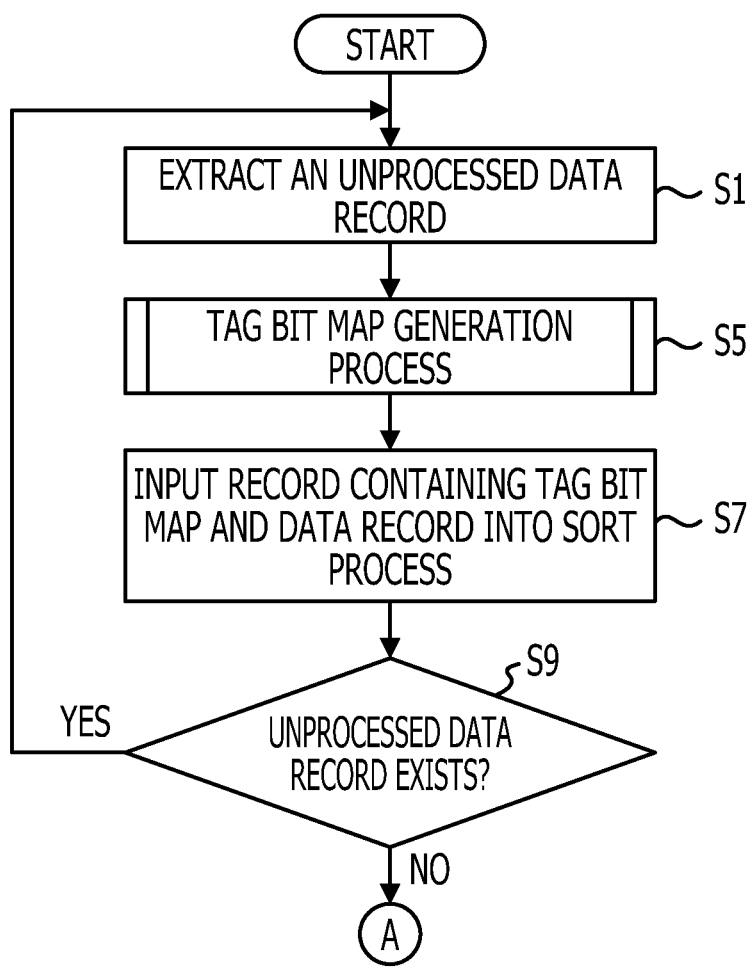
FIG. 13 illustrates an example of a process flow of processing during data storage according to a first embodiment.

The data extracting unit 131 extracts one data record to be stored in the second DB 140 from the first DB 120 at a given timing, and stores the extracted data record in the extracted data storage 132 (FIG. 13: S1). Subsequently, the tag bit map generating unit 133 carries out a tag bit map generation process on the extracted data record (S5). The tag bit map generation process will now be described using FIGS. 14 to 16.

Figure 14:
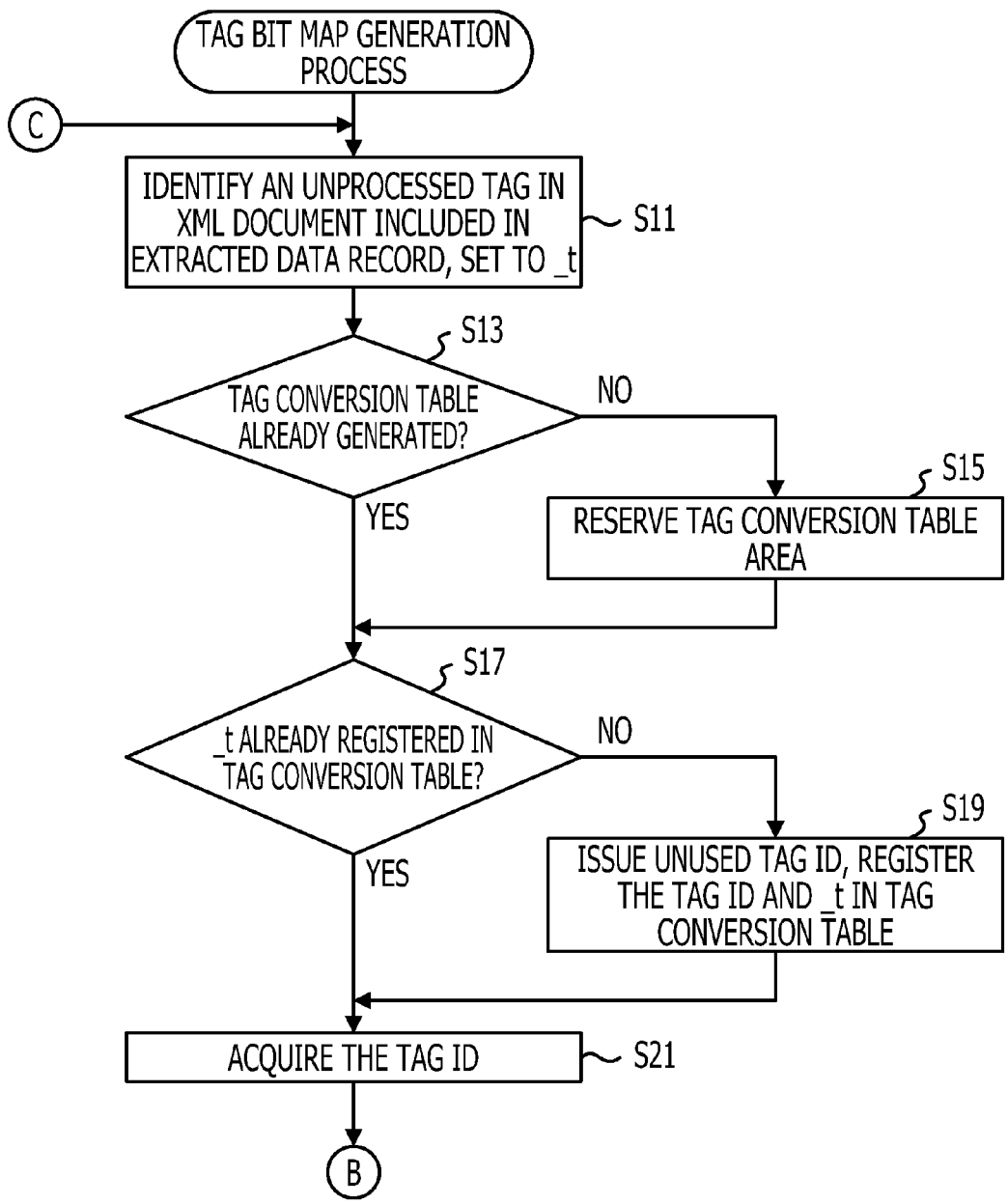
FIG. 14 illustrates an example of a process flow of a tag bit map generation process according to a first embodiment.

The tag bit map generating unit 133 specifies an unprocessed tag in an XML document (i.e., a report data block) included in the extracted data records, and sets the unprocessed tag in a variable _t (FIG. 14: S11). Subsequently, the tag bit map generating unit 133 determines whether or not a tag conversion table has already been generated in the tag conversion table storage 134 (S13). In the case where a tag conversion table has not been generated, the tag bit map generating unit 133 reserves an area for a tag conversion table in the tag conversion table storage 134 (S15). The process then proceeds to S17.

In the case where a tag conversion table has already been generated, or after S15, the tag bit map generating unit 133 determines whether or not _t has already been registered in the tag conversion table (S17). It is checked whether or not the tag name of _t is included in the tag name field. In the case where _t has not been registered in the tag conversion table, the tag bit map generating unit 133 issues an unused tag ID and registers that tag ID and _t in the tag conversion table. (S19). The process then proceeds to S21.

In the case where _t has already been registered in the tag conversion table, or after S19, the tag bit map generating unit 133 acquires the tag ID corresponding to _t from the tag conversion table (S21). The process then proceeds to the operations in FIG. 15 via the connector B.

Figure 15:
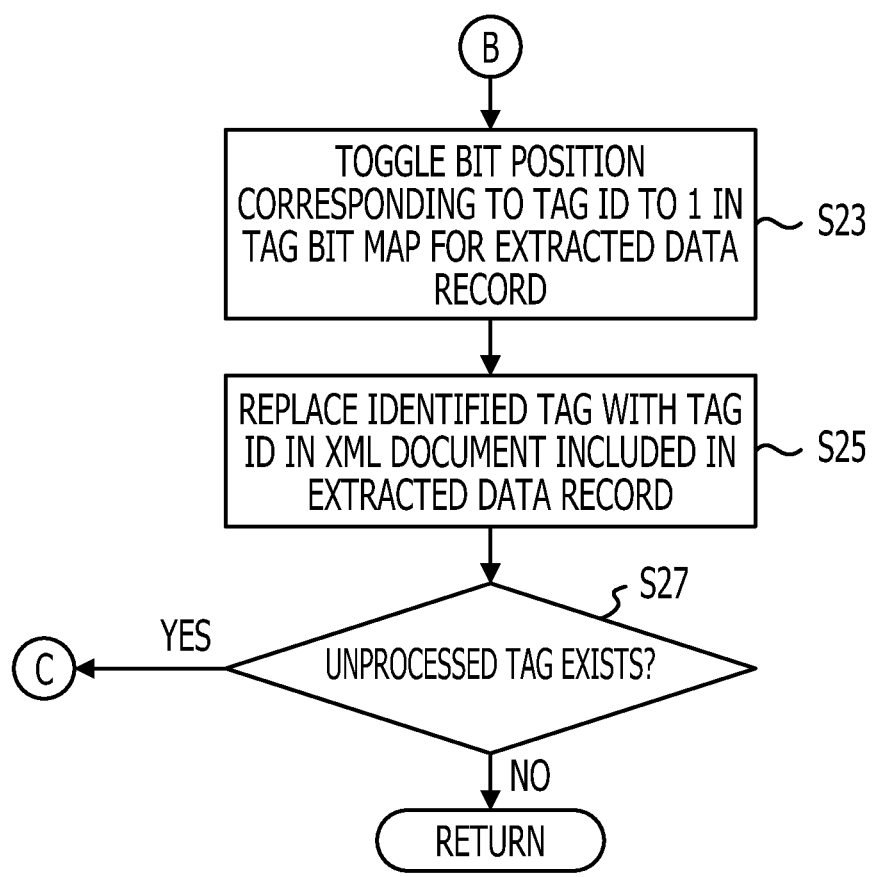
FIG. 15 illustrates an example of a process flow of a tag bit map generation process according to a first embodiment.
Figure 16:
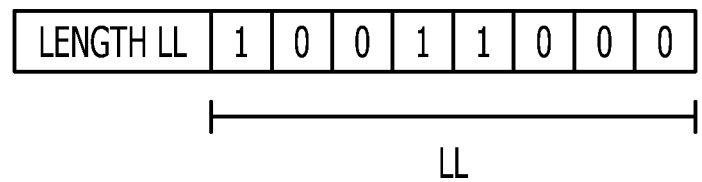
FIG. 16 illustrates an exemplary tag bit map format.

In FIG. 15, the tag bit map generating unit 133 sets the value 1 at the bit position corresponding to the tag ID in the tag bit map of the extracted data record (S23). Herein, the bit length of the tag bit map is set to a predetermined fixed length according to the number of tags which are expected to appear. For example, FIG. 16 illustrates a format in which a bit map is added to leading data of length LL. However, the bit map length may also be non-fixed.

Subsequently, the tag bit map generating unit 133 conducts a tag compression process in which the specified tag is replaced with its tag ID in the XML document included in the extracted data record (S25). This is equivalent to the process of converting FIG. 5A into 1001 in FIG. 7.

After that, the tag bit map generating unit 133 determines whether or not any unprocessed tags exist in the XML document included in the extracted data record (S27). If an unprocessed tag exists, the process returns to S11 in FIG. 14 via the connector C. In contrast, the flow returns to the parent process if unprocessed tags do not exist.

By carrying out such a process, a tag bit map like the tag bit map 1001t in FIG. 7 is generated. In other words, the tag-related characteristics of an XML document included in a data record are expressed as a tag bit map.

Returning to FIG. 13, the tag bit map generating unit 133 concatenates the generated tag bit map and the extracted data record, inputs the resulting record into the sorting unit 135, and causes the sorting unit 135 to carry out a sort process using the entire tag bit map as a sort key (S7). Since sorting itself is a well-established process, its description is omitted herein. The sorting unit 135 stores the sorted results in the extracted data storage 132.

The data extracting unit 131 then determines whether or not any unprocessed data records exist in the first DB 120 (S9). If no unprocessed data records exist, the process proceeds to the operations in FIG. 17 via the connector A. In contrast, the process returns to S1 if an unprocessed data record does exist.

Figure 17:
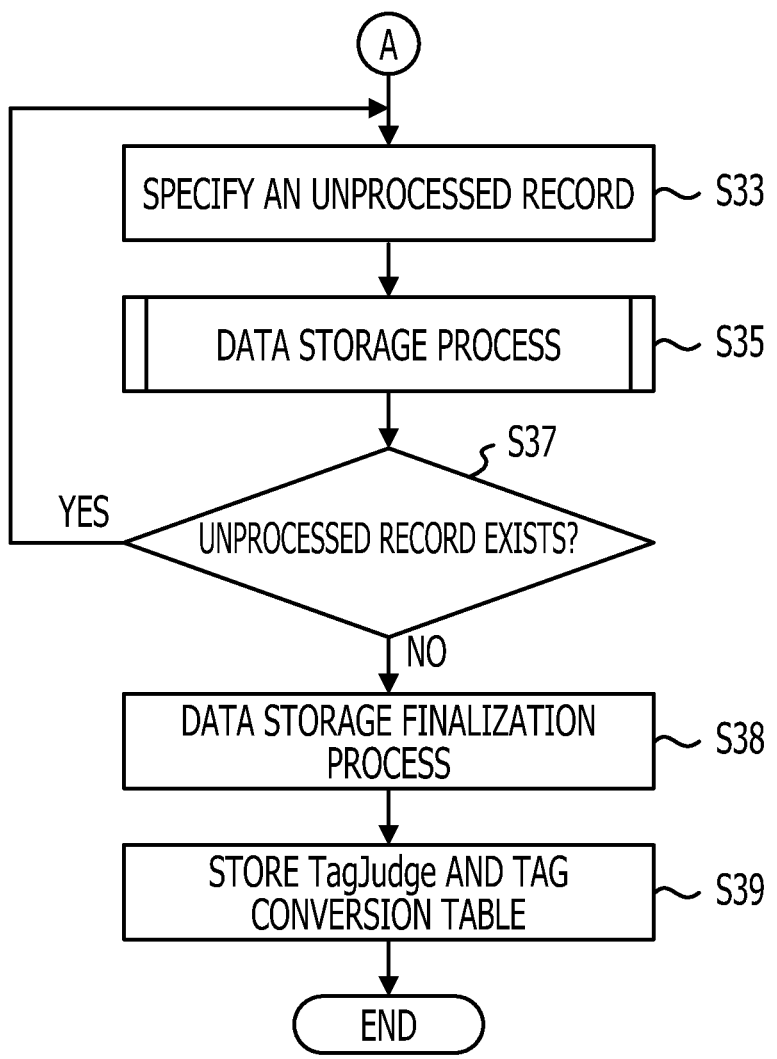
FIG. 17 illustrates an example of a process flow of a data storage process according to a first embodiment.
Figure 18:
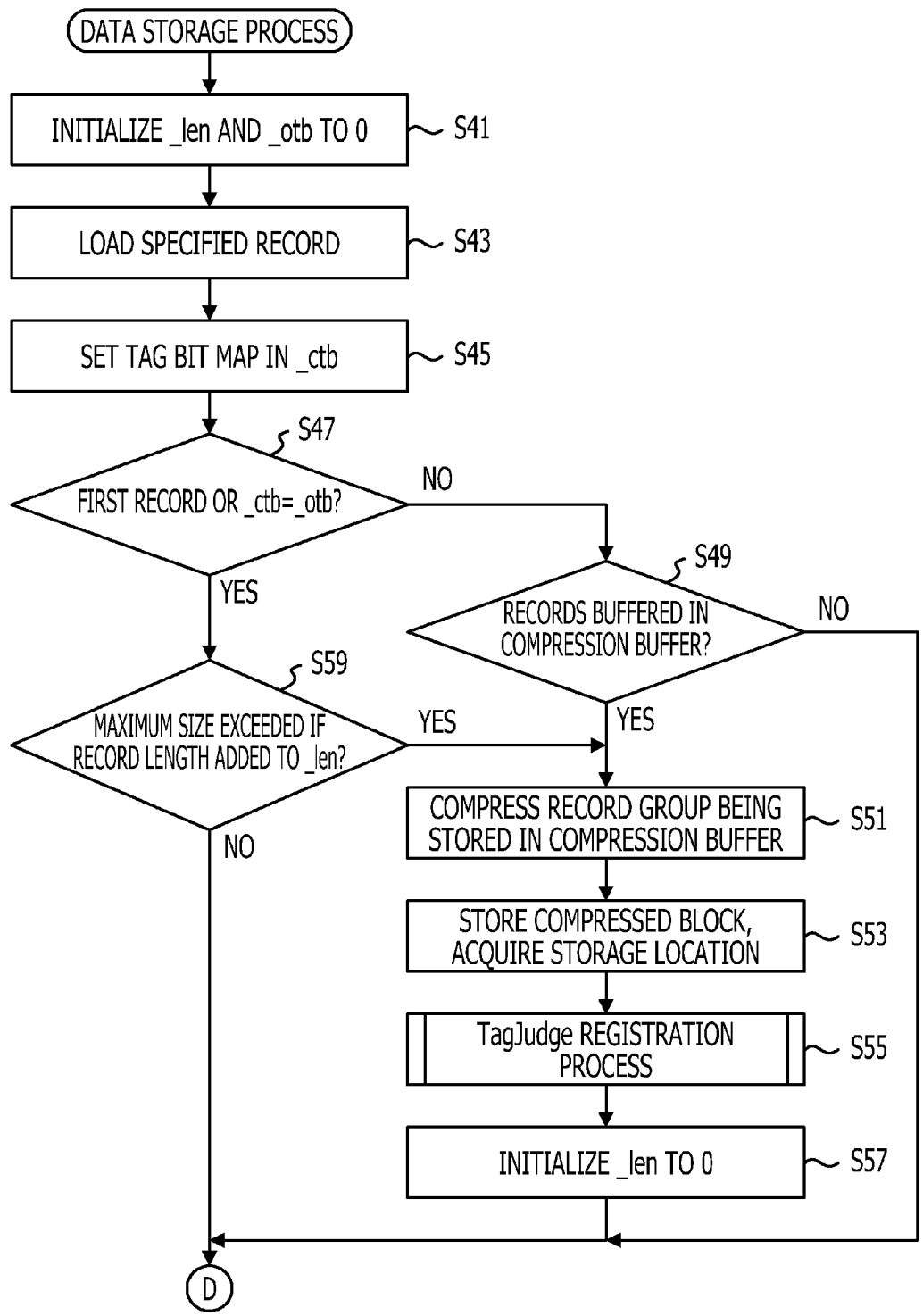
FIG. 18 illustrates an example of a process flow of a data storage process according to a first embodiment.

In FIG. 17, the data storage processing unit 136 specifies an unprocessed data record from among the sorted results being stored in the extracted data storage 132 (S33). The data storage processing unit 136 then carries out a data storage process (S35). The data storage process will now be described using FIGS. 18 to 22.

The data storage processing unit 136 initializes a variable _len that stores the data length and a variable _otb that retains the last tag bit map handled by the process. Both variables are initialized to 0 (FIG. 18: S41). The data storage processing unit 136 then loads the record that was specified in S33 (S43). After that, the data storage processing unit 136 sets the tag bit map included in the loaded record in a variable _ctb (S45).

In addition, the data storage processing unit 136 determines whether or not the specified record is the first record and also whether _ctb=_otb (S47). In the case where the specified record is the first record or in the case where _ctb=_otb (i.e., the case where the specified tag bit map is identical to the last tag bit map), the data storage processing unit 136 determines whether or not a maximum size (such as 5 MB, for example) would be exceeded if the record length of the loaded record were added to _len (S59). The process proceeds to the operations in FIG. 22 via the connector D in the case where the maximum size would not be exceeded even if the record length of the loaded record were added to _len. In contrast, the process proceeds to S51 in the case where the maximum size would be exceeded if the record length of the loaded record were added to _len.

In the case where it is detected in S47 that the specified record is not the first record and that _ctb=_otb is false, or in other words that the tag bit map differs from the last tag bit map, the data storage processing unit 136 determines whether or not buffered records exist in the compression buffer 138 (S49). The data storage processing unit 136 proceeds to the operations in FIG. 22 via the connector D in the case where no buffered records exist in the compression buffer 138. In contrast, in the case where buffered records do exist in the compression buffer 138, the data storage processing unit 136 compresses the record group being stored in the compression buffer 138 according to a given format to generate a compressed block (S51). The data storage processing unit 136 then stores the compressed block in the second DB 140, and acquires its storage location in the second DB 140 (S53).

Figure 19:
FIG. 19 illustrates an exemplary compressed block data structure.

FIG. 19 illustrates an exemplary data structure for compressed blocks in a single file. In this way, compressed blocks are stored with the block length attached. Note that FIG. 19 illustrates an example of storing compressed blocks concatenated in a single file. Herein, a storage location is specified by a file identifier (ID) and an offset in that file (also called the block offset). FIG. 19 illustrates the offset for a compressed block Blk3 as an example.

Additionally, the data storage processing unit 136 carries out a tag judge (TagJudge) registration process (S55). The TagJudge registration process will now be described using FIGS. 20 and 21.

Figure 20:
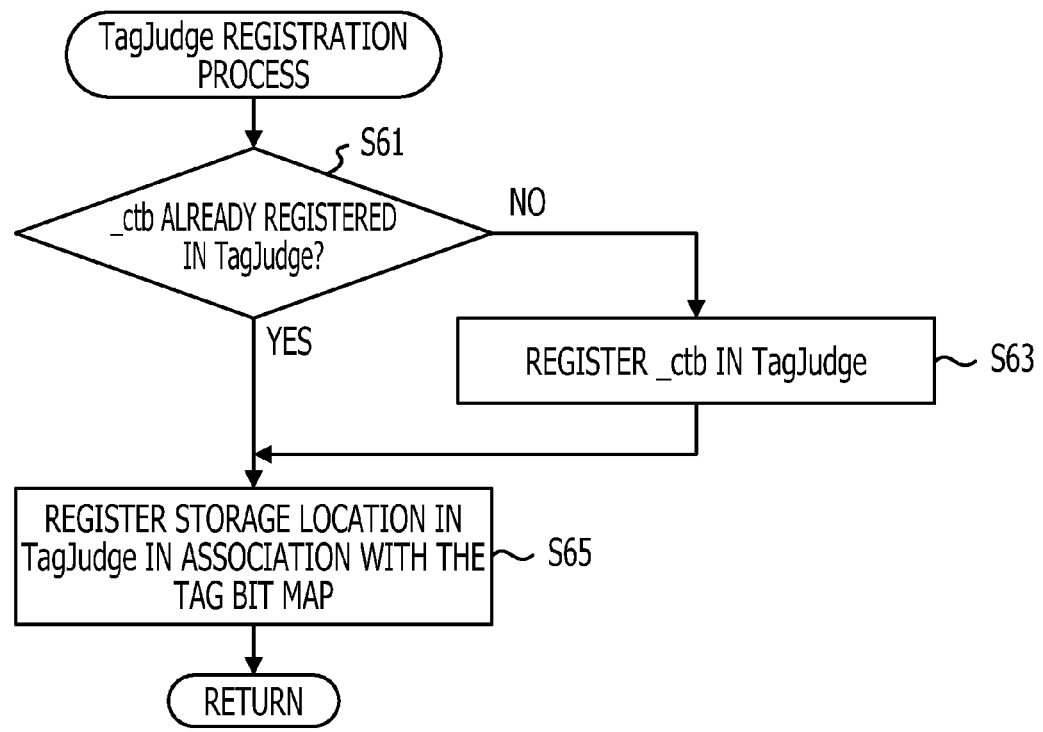
FIG. 20 illustrates an example of a process flow of a tag judge registration process.

First, the data storage processing unit 136 determines whether or not _ctb is already registered in the tag judge (TagJudge) (FIG. 20: S61). The process proceeds to S65 in the case where _ctb is already registered in the TagJudge. In contrast, in the case where _ctb is not registered in the TagJudge, the data storage processing unit 136 first registers _ctb in the TagJudge in the tag judge storage 137, for example (S63). The process then proceeds to S65.

FIG. 21 illustrates an exemplary data structure of a TagJudge in the tag judge storage 137. In the example in FIG. 21, the number of pointers to compressed blocks (BlkPtrCnt) and pointers (Ptr) to the compressed block storage locations are registered for individual types of tag bit maps (TagBmp). The storage locations of compressed blocks are expressed by combinations of a file ID and a block offset. As discussed hereinafter, since records are compressed together so as to not exceed a maximum size when many records exist for a single tag bit map, multiple compressed blocks may be generated in some cases. For this reason, the number of pointers are managed.

If _ctb is already registered in the TagJudge or after S63, the data storage processing unit 136 registers the storage location acquired in S53 in association with the corresponding tag bit map in the TagJudge (S65). Note that at this point, the pointer count is incremented by 1. The flow then returns to the parent process.

In so doing, it becomes possible to create a data structure for referencing relevant compressed blocks for individual types of tag bit maps.

Returning to FIG. 18, the data storage processing unit 136 initializes the variable _len to 0 (S57). The process then proceeds to the operations in FIG. 22 via the connector D.

Figure 22:
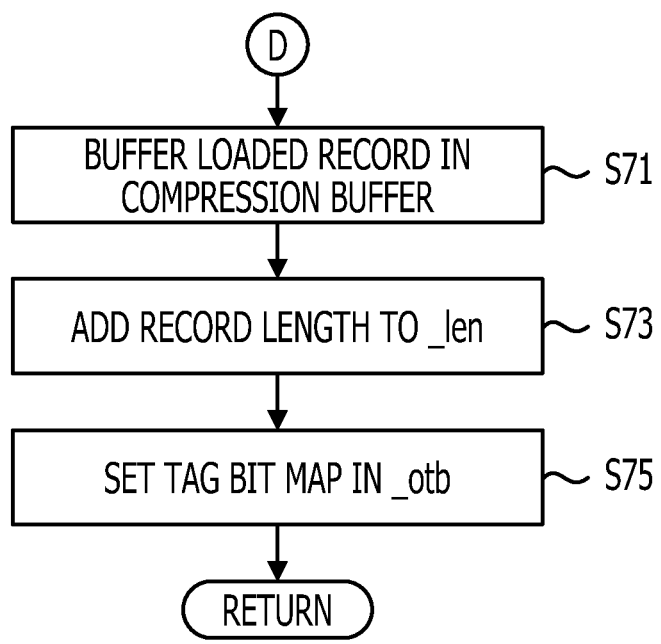
FIG. 22 illustrates an example of a process flow of a data storage process according to a first embodiment.

In FIG. 22, the data storage processing unit 136 buffers the record that was loaded in S43 in the compression buffer 138 (S71). The data storage processing unit 136 then adds the record length of the record stored in the compression buffer 138 to the variable _len (S73). Additionally, the data storage processing unit 136 sets the tag bit map in the variable _otb (S75). The flow then returns to the parent process.

By repeating such processing, records are compressed and stored in the second DB 140, while in addition, a TagJudge made up of index structure data used for searches is constructed.

Returning to FIG. 17, the data storage processing unit 136 determines whether or not any unprocessed records exist (S37). The process returns to S33 if an unprocessed record does exist. In contrast, the data storage processing unit 136 carries out a data storage finalization process if no unprocessed records exist (S38). In other words, the records remaining in the compression buffer are processed. Specifically, steps S51 to S55 are performed for the last tag bit map substituted into the variable _ctb.

After that, the data storage processing unit 136 takes the TagJudge in the tag judge storage 137 and the tag conversion table being stored in the tag conversion table storage 134, and stores them together in the second DB 140 (S39). Data like that illustrated in FIG. 23 is stored in the second DB 140 in addition to files containing compressed blocks. In other words, index structure data which is used for searches which includes a tag conversion table and a TagJudge is stored.

Figure 24:
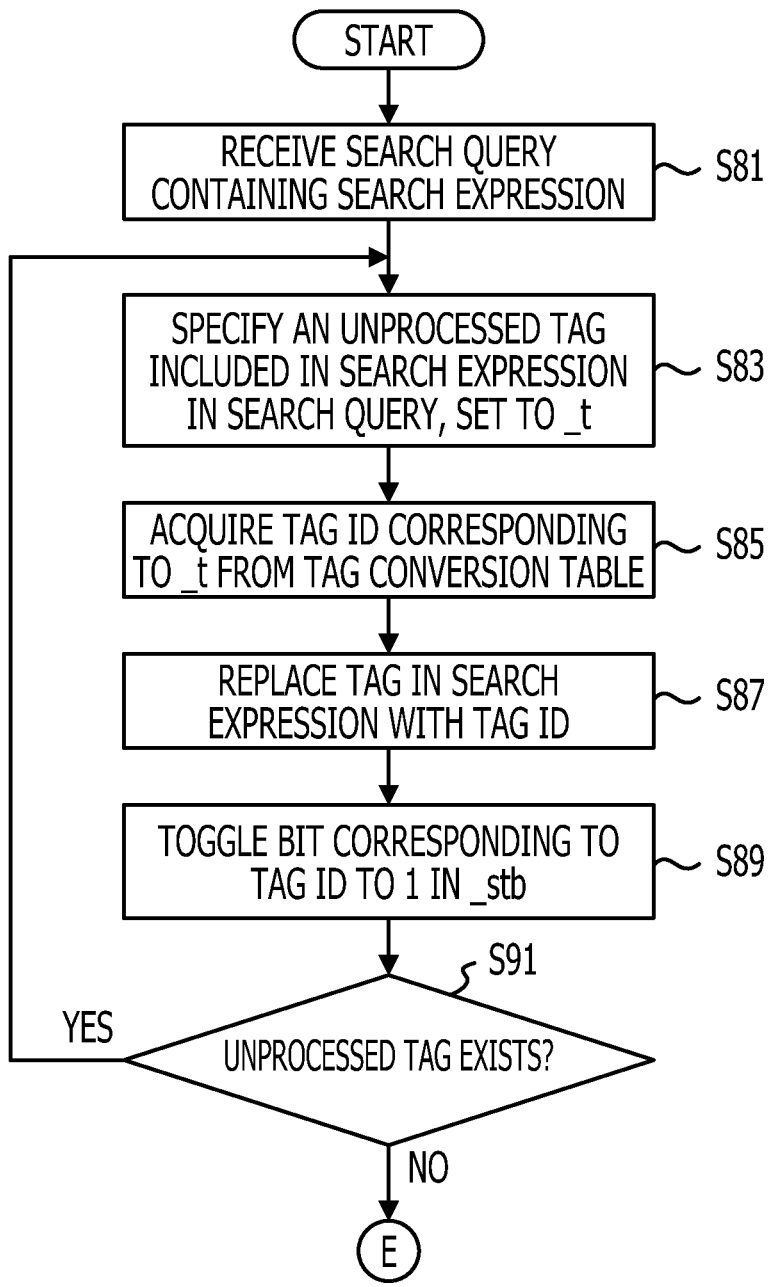
FIG. 24 illustrates an example of a process flow of processing during search according to a first embodiment.

Next, processing during a search will be described using FIGS. 24 and 25. The interface 151 of the search processing unit 150 receives a search query containing a search expression from an analysis system or other source (FIG. 24: S81). The interface 151 then outputs search expression data to the search expression processing unit 152. The search expression processing unit 152 specifies an unprocessed tag included in the search expression from the search query, and sets the specified tag in a variable _t (S83). The search expression processing unit 152 then acquires the tag ID corresponding to _t from the tag conversion table stored in the second DB 140 (S85).

After that, the search expression processing unit 152 replaces the tag in the search expression with the tag ID (S87). The search expression processing unit 152 also sets the bit position corresponding to the tag ID to the value 1 in a bit map _stb (S89). After that, the search expression processing unit 152 determines whether or not any unprocessed tags exist in the search expression (S91). The process returns to S83 if an unprocessed tag exists. In contrast, in the case where no unprocessed tags exist, the search expression processing unit 152 outputs the bit map _stb to the data extracting unit 153, and outputs the substituted search expression data to the searching unit 155. The process then proceeds to the operations in FIG. 25 via the connector E.

Figure 25:
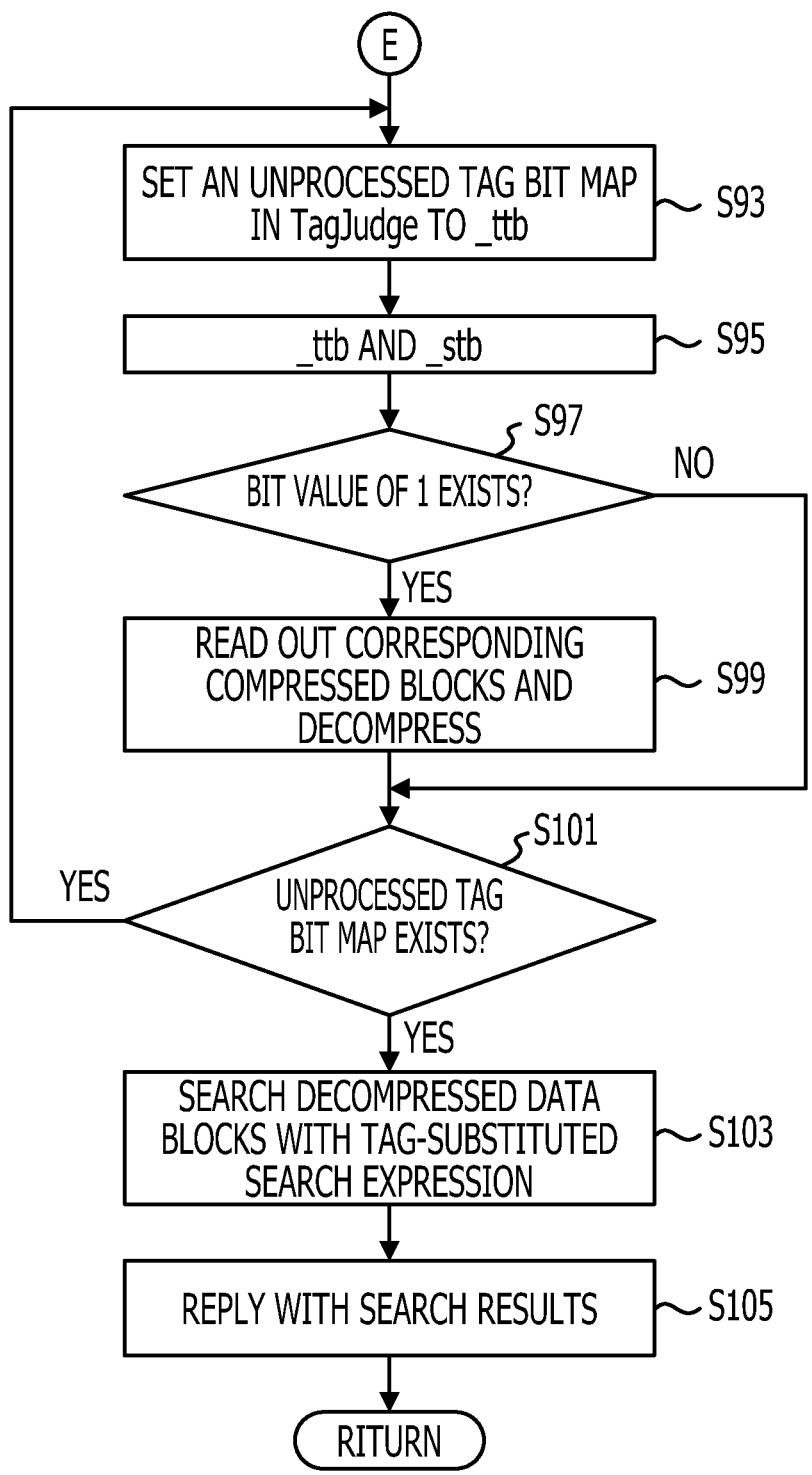
FIG. 25 illustrates an example of a process flow of processing during search according to a first embodiment.

In FIG. 25, the data extracting unit 153 sets an unprocessed tag bit map in the TagJudge stored in the second DB 140 to _ttb (S93). The data extracting unit 153 then performs a bitwise AND on the bit map _stb and the read-out tag bit map _ttb (S95). The data extracting unit 153 then determines if any bit positions are at the value 1 (S97). If all bit positions are at the value 0, this indicates that no report data hits were found for the search expression, and thus the process proceeds to S101.

In contrast, if any bit positions are at the value 1, the data extracting unit 153 reads out the pointers stored in association with the read-out tag bit map, reads out the compressed blocks indicated by the pointers from the second DB 140, carries out a decompression process that is the reverse of the compression process, and stores the decompressed results in the data storage 154 (S99).

After that, the data extracting unit 153 determines whether or not any unprocessed tag bit maps exist in the TagJudge (S101). The process returns to S93 if an unprocessed tag bit map exists in TagJudge. In contrast, in the case where no unprocessed tag bit maps exist in the TagJudge, the searching unit 155 searches the decompressed data blocks stored in the data storage 154 with the search expression whose tags have been replaced with tag IDs, and extracts report data (i.e., XML documents) satisfying the search expression parameters (S103). If report data satisfying the parameters exists, the searching unit 155 outputs that report data to the interface 151, whereas if such report data does not exist, the searching unit 155 notifies the interface 151 of the null result. The interface 151 transmits the search results as a reply to the analysis system or other apparatus that originally transmitted the search query (S105).

By carrying out processing like the above, original data records are clustered by tag bit map, and thus access is also localized during searches using a tag bit map. Particularly, in the case of archiving data in compressed form, such localization of access acts to decrease the amount of data to decompress, which speeds up response to search queries and reduces the processing load. Moreover, if access can be localized with less used disk space, personnel costs related to disk device management can also be decreased. Furthermore, since a tag conversion table that acts as the basis for the tag bit maps is generated as new tags appear, manual design can be reduced or omitted, and personnel or other costs can be decreased.

Although an example of performing tag compression is illustrated in the embodiment discussed above, tag compression may also be reduced or omitted in some cases. Furthermore, data compression itself may also not be conducted in some cases.

Additionally, formats such as those of the TagJudge and the tag conversion table are not limited to the examples discussed above, and their storage location may be another data storage unit rather than the second DB 140 in some cases.

In the first embodiment, since sorting is carried out using the entire tag bit map as a sort key, the sort time may become longer as the bit length of the sort key increases with more tags. The number of different tags varies by environment, but in some cases several thousand to several tens of thousand may exist. Consequently, in the present embodiment, the bit length of the sort key is made shorter than the bit length of the tag bit map in order to reduce the sorting time. However, if the sort key is simply shortened while also simply generating a tag conversion table as new tags appear as in the first embodiment, there is a possibility of a phenomenon occurring in which sorting is not conducted for tags which are frequently used for searches. In such cases, data including tags which are frequently used for searches may become dispersed over many compressed blocks, and the advantages of access localization during searches may be lost. Accordingly, by carrying out processing like that discussed below, the bit length of the sort key can still be shortened while mitigating the effects on search processing.

An overview of processing in the present embodiment will now be described using FIGS. 26 to 46. The present embodiment generates a tag conversion table such that tags which are used more frequently for searches become higher-order bits in the tag bit map during search processing. In addition, newly appearing tags are assigned to bit positions that are lower-order than those of the tags used for searches.

Figure 26:
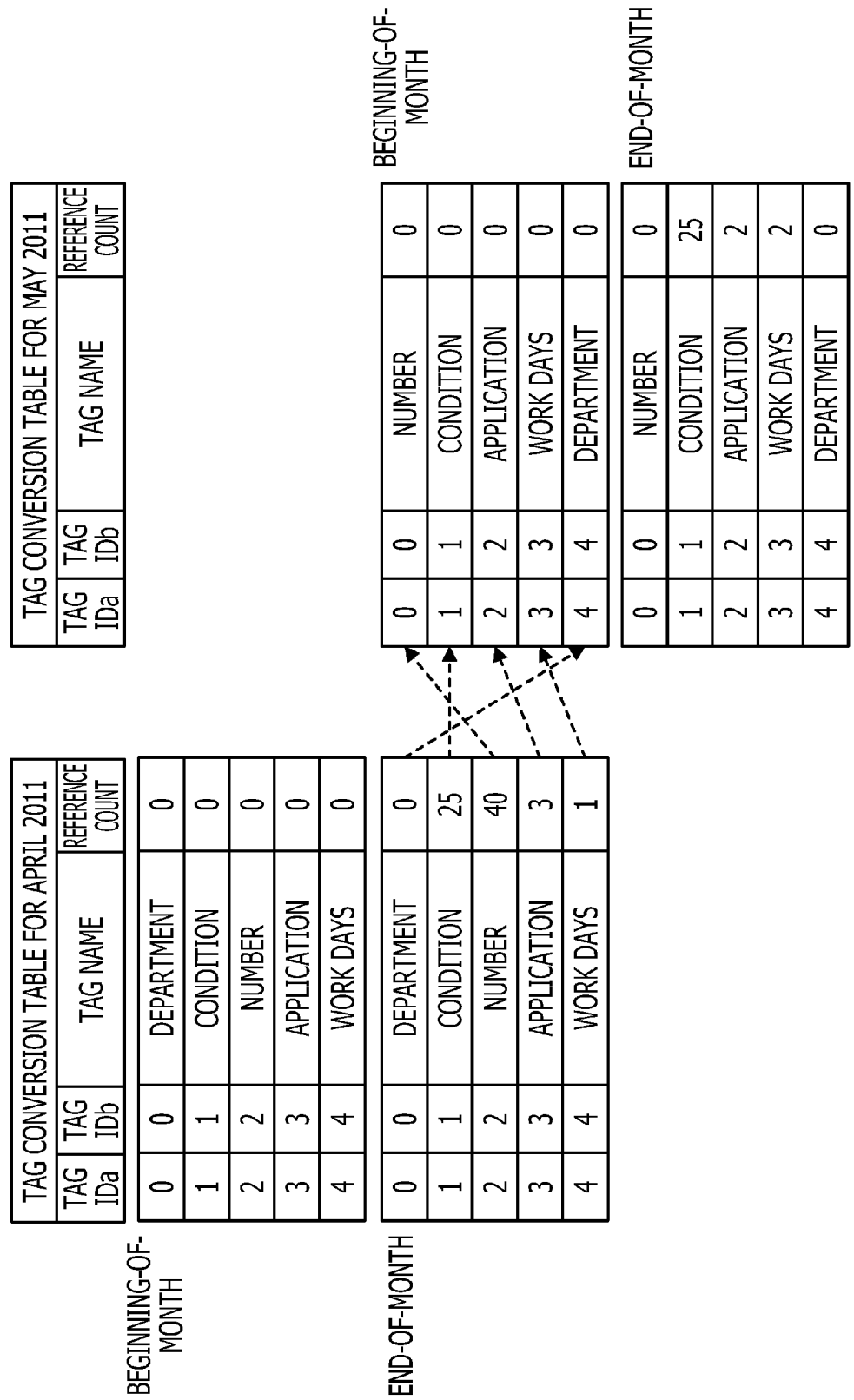
FIG. 26 is an explanatory diagram regarding a process for generating a tag conversion table according to a second embodiment.

As illustrated in FIG. 26, a beginning-of-month tag conversion table for April 2011 may be generated from March 2011 search results, for example. In the present embodiment, the tag conversion table includes fields for a tag IDa used when generating a bit map from a search expression, a tag IDb used when replacing tags included in a search expression, a tag name, and a counter for the reference count. At the beginning of April 2011, the tag IDa and the tag IDb are taken to be equal, and the reference count is 0.

Subsequently, assume that the data from March 2011 is used for search processing for a one-month period in April 2011, and an end-of-month state for April 2011 is reached, for example. Ranked in descending order of reference count, the tags have become "Number", "Condition", "Application", "Work days", and "Department". Thus, in the beginning-of-month tag conversion table for May 2011, tag IDs are determined according to the order of the reference counts. In other words, the tag IDa and the tag IDb are assigned in the order of "Number", "Condition", "Application", "Work days", and "Department". Subsequently, assume that the data from April 2011 is used for search processing for a one-month period in May 2011, and an end-of-month state for May 2011 is reached, for example. Note that the data generated in April 2011 is an example of the case of no change in the types of tags that appear.

Figure 27:
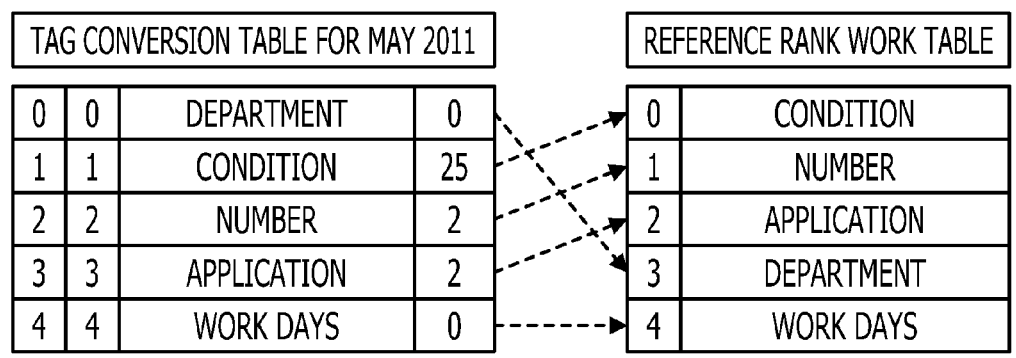
FIG. 27 is an explanatory diagram regarding a process for generating a tag conversion table according to a second embodiment.

Next, in the case of generating a beginning-of-month tag conversion table for June 2011, a reference rank work table like that illustrated in FIG. 27 is generated on the basis of reference counts like those illustrated in the lower-right of FIG. 26. In other words, a table in which tag names are arranged in descending order according to their reference counts is generated as a reference rank work table. In this example, tag names with a reference count of 0 are still registered in the reference rank work table. Next, assume that a change occurs in the types of tags that appear while storing the data generated in May 2011 in the second DB 140. For example, assume that the "Application" and "Work days" tags do not appear, and that "Sales", "Product", and "Price" tags newly appear.

In such cases, the respective tag IDs and bit positions for "Condition", "Number", "Application", "Department", and "Work days" are kept, and of these, the tags confirmed to appear in the data generated in May 2011 are validated at their bit positions in a tag conversion work table like that illustrated in FIG. 28. Since the "Application" and "Work days" tags did not appear in the data generated in May 2011 as discussed above, their bit positions become empty. Then, the newly appearing "Sales", "Product", and "Price" tags are assigned the tag IDs "5", "6", and "7" in order of their appearance. Unused tag IDs are produced in this way, but since a tag bit map is generated in parallel with the generation of the tag conversion work table, the original tag IDs are adopted as the tag IDb in a condensed format that drops the empty portions, as illustrated in FIG. 29. Furthermore, since the TagJudge is also condensed by dropping unused bit positions to reduce the data size, the tag IDa expressing the matrix order is set in order to associate tags with the TagJudge.

Although the method of generating a tag conversion table differs from that of the first embodiment as discussed above, the processing for generating a tag bit map for each XML document on the basis of a tag conversion work table that acts as the basis for the tag conversion table is similar. Specifically, a tag ID (the tag IDb in the tag conversion table) for a tag included in an XML document is specified from the tag conversion work table, and the bit position corresponding to that tag ID is toggled on (set to the value 1, for example). For example, if the bit positions for the tag IDs "0", "1", and "3" are toggled on, "110100000" is generated as in the first line in FIG. 30. Other XML documents are similarly processed.

Figure 30:
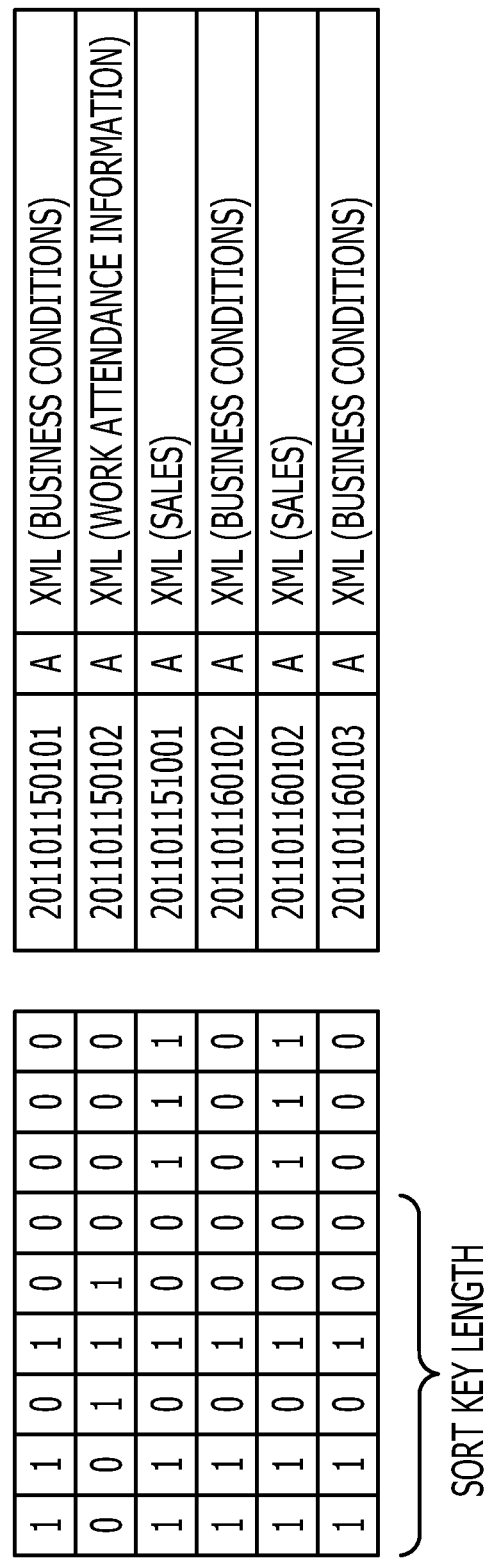
FIG. 30 schematically illustrates an example of processing according to a second embodiment.

Tag bit maps generated in this way are concatenated with data records extracted from the first DB 120 and sorted using a bit group from among the tag bit map portion that is equal to a predetermined sort key length (such as 6 bits, for example) as a sort key, as illustrated in FIG. 30. The sort key length is shorter compared to that of the first embodiment.

Figure 31:
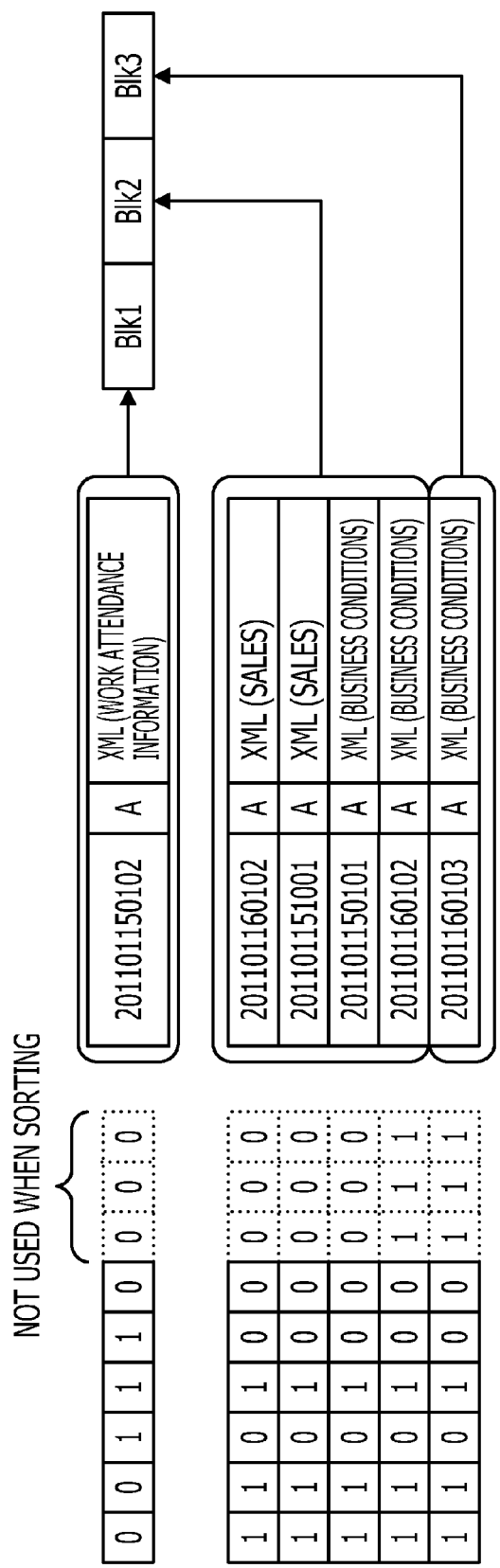
FIG. 31 schematically illustrates an example of processing according to a second embodiment.

In the case of processing six records as illustrated in FIG. 30, the records are sorted as illustrated in FIG. 31. In the present embodiment, records are sorted by the leading 6 bits only, and thus any differences in the lower 3 bits are ignored. Consequently, although the records originally may have been clustered (also called being grouped) into three clusters, the records are instead clustered into two clusters as illustrated in FIG. 31. In this way, similar tag bit maps, which match the higher sort key length but otherwise do not match, are grouped into the same clusters. Additionally, the record data belonging to each cluster is compressed. In other words, the data from one or more records grouped into the same cluster is compressed together to generate a compressed block, which is stored in the second DB 140. In the example in FIG. 31, there is one record from which the tag bit map "001110000" was generated. The data from this record is compressed to generate a compressed block Blk1, which is stored in a given location in the second DB 140. Also, there are similar tag bit maps "110100000" and "110100111" whose higher 6 bits are "110100". Of these five records, four records are compressed together to generate a compressed block Blk2, which is stored in a given location in the second DB 140. Although the higher 6 bits "110100" of the last record also match, since the data size of the five records exceeds a threshold value, the last record is separately compressed to generate a compressed block Blk3, which is stored in a given location in the second DB 140. It is also assumed that record groups extracted together from the first DB 120 are stored in the same partition, etc. of the second DB 140.

Additionally, a tag judge (TagJudge) that acts as a document structure index is also generated in order to handle search queries from analysis systems or other sources. In this example, a tag judge like that illustrated in FIG. 32 is generated. Specifically, pointers to corresponding compressed blocks are registered for individual tag bit map types. In this example, a pointer ptr to the compressed block Blk1 is registered for the tag bit map "001110000", a pointer to the compressed block Blk2 is registered for the tag bit map "110100000", and pointers to the compressed blocks Blk2 and Blk3 are registered for the tag bit map "110100111".

Furthermore, in the present embodiment, a tag conversion table is generated from a tag conversion work table, and in addition, the TagJudge generated above is transformed, as discussed earlier. Although different from the example illustrated in FIGS. 26 to 29, in the case where the tag name with the tag ID "5" in the tag conversion work table does not appear in the processed XML documents, that tag is dropped and the rest of the table is shifted upward, as illustrated in FIG. 33. Additionally, a tag IDa is added, which is both the matrix number in the tag conversion table as well as the tag ID used when generating a bit map from a search expression during a search. Consequently, whereas a serial number is added as the tag IDa, the tag IDb is used to replace tags included in a search expression, and thus the tag IDb is enumerated while skipping the tag ID "5", which does not appear. In other words, the tag ID from the tag conversion work table is used as-is. Additionally, a column for counting the reference count during searches is also provided.

Also, in the present embodiment, the TagJudge is transformed as illustrated in FIG. 34 to match the transformation of the tag conversion table. The bit position corresponding to the tag ID "5" (i.e., the 6th bit position from the high-order bit) is deleted and the lower bit positions are shifted left. In so doing, the data size of the TagJudge can be decreased.

Figure 35:
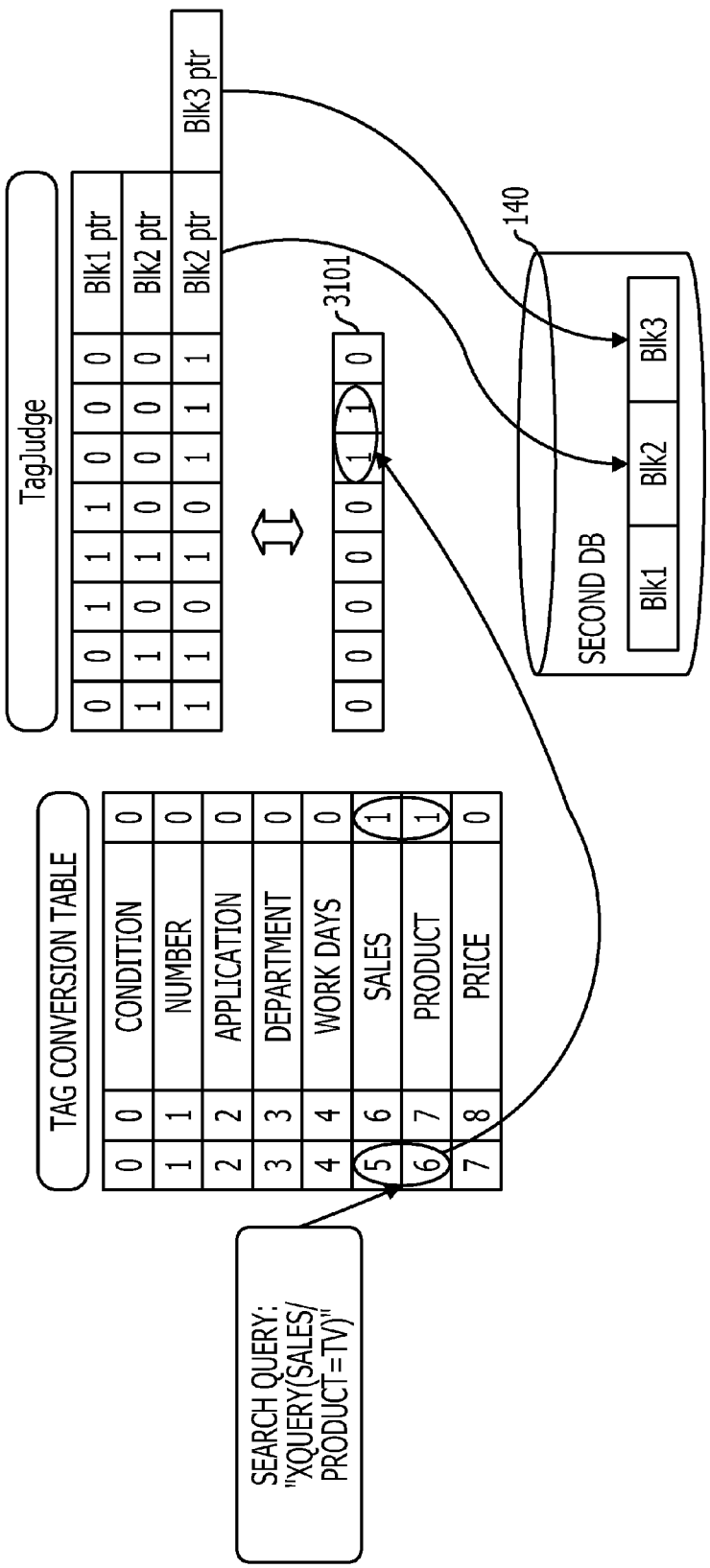
FIG. 35 schematically illustrates an example of processing according to a second embodiment.

Next, an overview of processing during search will be described using FIGS. 35 and 36. As an example, the case of receiving a search query that contains the search expression "XQUERY(sales/product=TV)" will be described. Specifically, a search query requesting the extraction of report data blocks containing data on TVs in a sales tag or a product tag.

Consequently, the corresponding tag IDa for the parameters "sales" and "product" contained in the search expression are read out from the tag conversion table. In this example, "5" and "6" are specified. Thus, a search expression bit map 3101 is generated with the 5th and 6th bit positions set to the value 1. In the example in FIG. 35, "00000110" is obtained. Then, a bitwise AND operation is performed on this search expression bit map 3101 and the tag bit maps included in each of the records in the tag judge. Records in the tag judge for which the value 1 was produced at either bit position are specified. In this example, the third record has the value 1 set at the 5th and 6th bit positions, and this record is specified. Thus, since pointers ptr to the corresponding compressed blocks Blk2 and Blk3 are obtained, the compressed blocks Blk2 and Blk3 being stored in the second DB 140 are read out.

Also, the count value of the reference count is incremented by 1 for the records with the tag IDa "5" and "6" in the tag conversion table.

Figure 36:
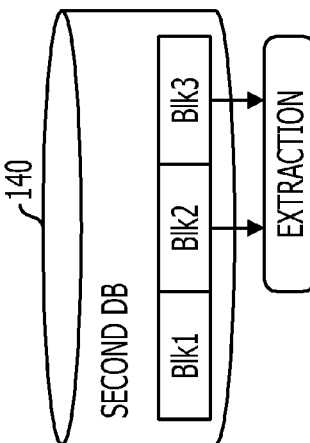
FIG. 36 schematically illustrates an example of processing according to a second embodiment.

Next, the compressed blocks Blk2 and Blk3 are decompressed and the original data records are restored, as illustrated in FIG. 36. Note that since tags are compressed inside the report data blocks, the search expression is also tag-compressed using the tag IDb before carrying out the search process. In other words, the tag conversion table is used to convert the search expression into "XQUERY(6/7=TV)", and a search process is conducted on the decompressed data records. In the case where report data blocks matching the parameters of the search process exist, the matching report data blocks are output.

In this way, the scope of compressed blocks to decompress is localized by the tag judge, thus reducing computational costs during a search. Additionally, it is possible to avoid designs that involve installing multiple disk devices or distributing data over such multiple disk devices in order to speed up performance with parallel access. Also, it is possible to speed up sorting conducted when storing data in the second DB 140.

In the example discussed above, tags may still be assigned a higher tag ID in the tag conversion work table, even if their reference count is 0. However, rather than assigning a higher tag ID to tags with a reference count equal to 0 or less than or equal to a predetermined threshold value, the tag conversion work table may be transformed so as to add new lower bits in the case where such tags appear in an XML document currently being processed for data storage, for example.

The configurations of the data migration unit 130 and the search processing unit 150 that carry out such processing are similar to those illustrated in FIGS. 2 and 3, although their operation differs. Consequently, description of the configurations themselves is omitted.

Details of processing according to the present embodiment will now be described using FIGS. 37 to 46.

Figure 37:
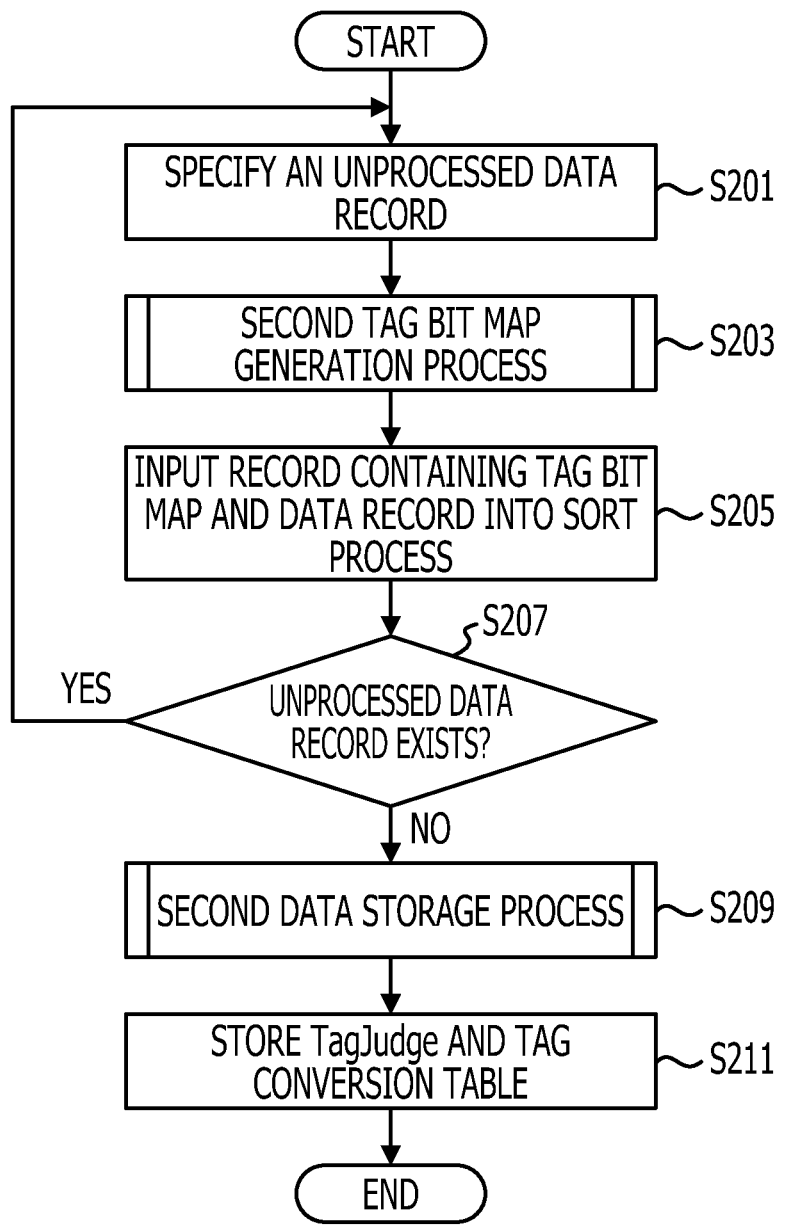
FIG. 37 illustrates an example of a process flow of processing during data storage according to a second embodiment.

The data extracting unit 131 extracts one data record to be stored in the second DB 140 from the first DB 120 at a given timing, and stores the extracted data record in the extracted data storage 132 (FIG. 37: S201). Subsequently, the tag bit map generating unit 133 carries out a second tag bit map generation process on the extracted data record (S203). The second tag bit map generation process will now be described using FIGS. 38 and 39.

Figure 38:
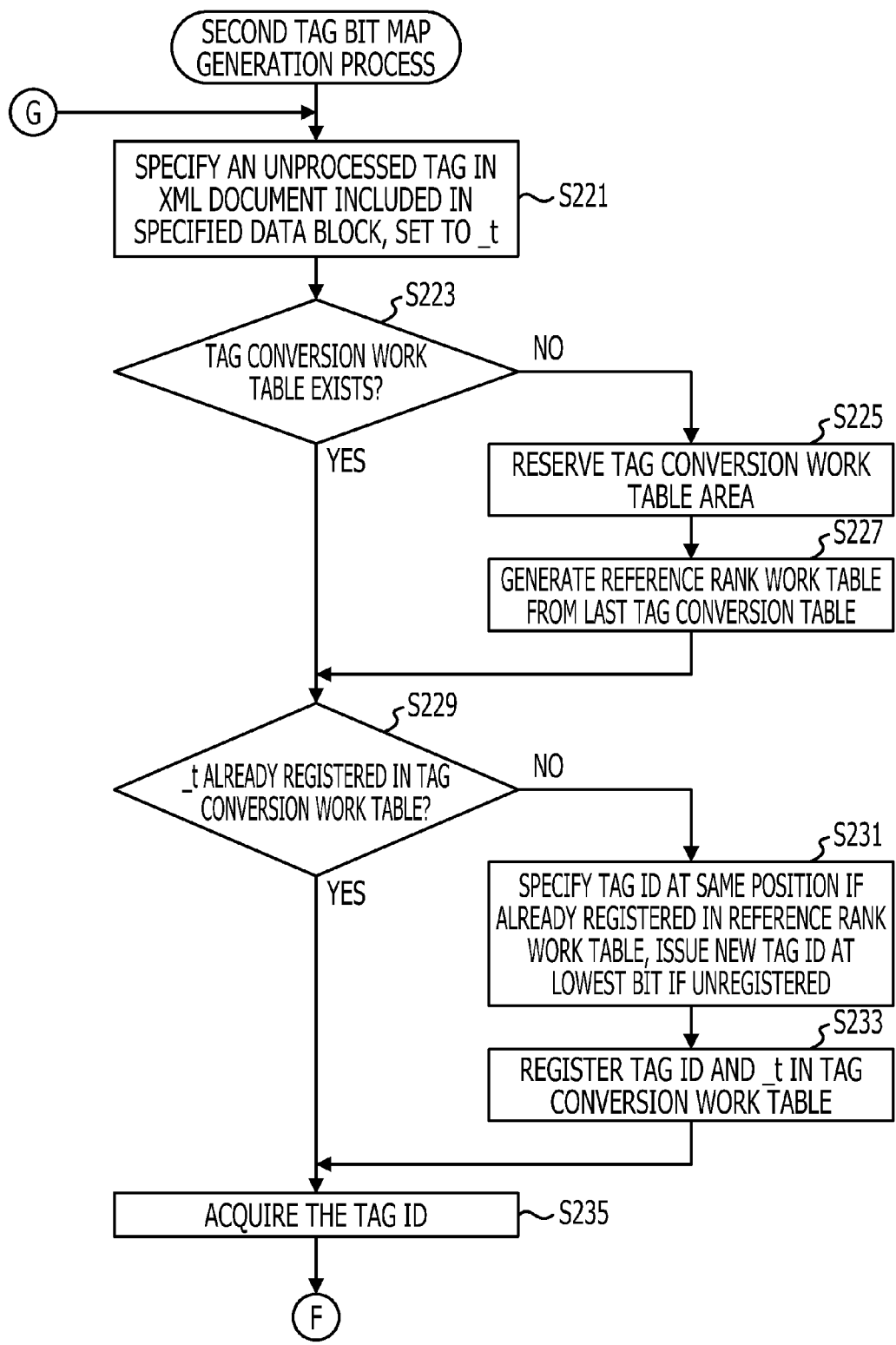
FIG. 38 illustrates an example of a process flow of a second tag bit map generation process according to a second embodiment.

The tag bit map generating unit 133 specifies an unprocessed tag in an XML document (i.e., a report data block) included in the extracted data records, and sets the unprocessed tag in a variable _t (FIG. 38: S221). Subsequently, the tag bit map generating unit 133 determines whether or not a tag conversion work table has already been generated in the tag conversion table storage 134 (S223). In the case where a tag conversion work table has not been generated, the tag bit map generating unit 133 reserves an area for a tag conversion work table in the tag conversion table storage 134, for example (S225). In addition, the tag bit map generating unit 133 generates a reference rank work table (see FIG. 27) from the last tag conversion table stored in the second DB 140, and stores the generated reference rank work table in the tag conversion table storage 134 (S227). Specifically, tags are arranged in order of highest reference count, and higher tag IDs are assigned in that order. The process then proceeds to S229.

In the case where a tag conversion work table has already been generated, or after S227, the tag bit map generating unit 133 determines whether or not _t has already been registered in the tag conversion work table (S229). It is checked whether or not the tag name of _t is included in the tag name field. In the case where _t is not registered in the tag conversion work table, the tag bit map generating unit 133 searches the reference rank work table for _t and determines whether or not _t is registered, and if registered, specifies the tag ID in the reference rank work table. In the case where _t is not registered in the reference rank work table, the tag bit map generating unit 133 issues a new tag ID at the lowest bit position (S231). In the case where _t is already registered in the reference rank work table, the tag ID in the reference rank work table is kept. In all other cases, a new lower tag ID is issued. The tag bit map generating unit 133 then registers the tag ID and _t in the tag conversion work table (S233). The process then proceeds to S235.

In the case where _t has already been registered in the tag conversion work table, or after S233, the tag bit map generating unit 133 acquires the tag ID corresponding to _t from the tag conversion work table (S235). The process then proceeds to the operations in FIG. 39 via the connector F.

Figure 39:
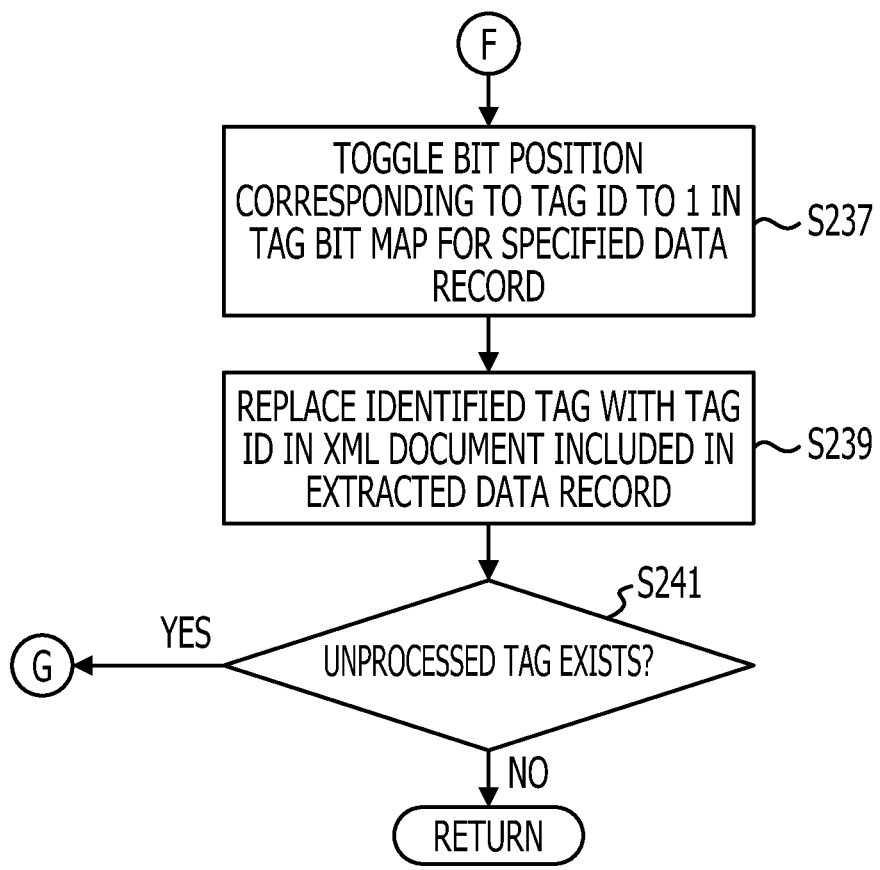
FIG. 39 illustrates an example of a process flow of a second tag bit map generation process according to a second embodiment.

In FIG. 39, the tag bit map generating unit 133 sets the value 1 at the bit position corresponding to the tag ID in the tag bit map of the extracted data record (S237). Herein, the bit length of the tag bit map is set to a predetermined fixed length according to the number of tags which are expected to appear. For example, FIG. 16 illustrates a format in which a bit map is added to leading data of length LL. However, the bit map length may also be non-fixed.

Subsequently, the tag bit map generating unit 133 conducts a tag compression process in which the specified tag is replaced with its tag ID in the XML document included in the extracted data record (S239). This is equivalent to the process of converting FIG. 5A into 1001 in FIG. 7.

After that, the tag bit map generating unit 133 determines whether or not any unprocessed tags exist in the XML document included in the extracted data record (S241). If an unprocessed tag exists, the process returns to S221 in FIG. 38 via the connector G. In contrast, the flow returns to the parent process if unprocessed tags do not exist.

By carrying out such a process, a tag bit map like the tag bit map 1001t in FIG. 7 is generated. In other words, the tag-related characteristics of an XML document included in a data record are expressed as a tag bit map. Although the generated tag bit map is the same as that of the first embodiment, the generated tag conversion work table differs from the tag conversion table in the first embodiment.

Returning to FIG. 37, the tag bit map generating unit 133 concatenates the generated tag bit map and the extracted data record, inputs the resulting record into the sorting unit 135, and causes the sorting unit 135 to carry out a sort process using just the predetermined sort key length (S205). Since sorting itself is a well-established process, its description is omitted herein. The sorting unit 135 stores the sorted results in the extracted data storage 132. Unlike the first embodiment, a sort key length that is shorter than the tag bit map length is adopted. The sort key length is determined on the basis of factors such as sorting performance.

The data extracting unit 131 then determines whether or not any unprocessed data records exist in the first DB 120 (S207). The process returns to S201 if an unprocessed data record does exist.

In contrast, the data storage processing unit 136 carries out a second data storage process if no unprocessed data records exist (S209). The second data storage process will now be described using FIGS. 40 to 44.

The data storage processing unit 136 initializes a variable _len that stores the data length and a variable _otb that retains the last tag bit map handled by the process. Both variables are set to 0 (FIG. 40: S251). Also, the data storage processing unit 136 initializes a WkTagBmp list for temporarily retaining tag bit maps corresponding to records stored in the compression buffer 138 (S253). The WkTagBmp list is stored in a storage device such as the main memory, for example.

The data storage processing unit 136 then loads an unprocessed data record from among the sorted data records being stored in the extracted data storage 132 (S255). After that, the data storage processing unit 136 sets an upper bit sequence equal to the sort key length from the tag bit map included in the loaded record in a variable _ctb (S257).

After that, the data storage processing unit 136 determines whether or not the loaded record is the first record or whether _ctb=_otb (S259). In the case where the loaded record is the first record or in the case where _ctb=_otb (i.e., the case where the specified tag bit map (specifically the sort key length portion thereof) is identical to the last tag bit map (specifically the sort key length portion thereof)), the data storage processing unit 136 determines whether or not a maximum size (such as 5 MB, for example) would be exceeded if the record length of the loaded record were added to _len (S267). The process proceeds to S263 in the case where the maximum size would be exceeded if the record length of the loaded record were added to _len. In contrast, the data storage processing unit 136 carries out a WkTagBmp list registration process in the case where the maximum size would not be exceeded if the record length of the loaded record were added to _len (S269). The WkTagBmp list registration process will now be described using FIG. 41. Note that once S269 is completed, the process proceeds to the operations in FIG. 44 via the connector H.

Figure 41:
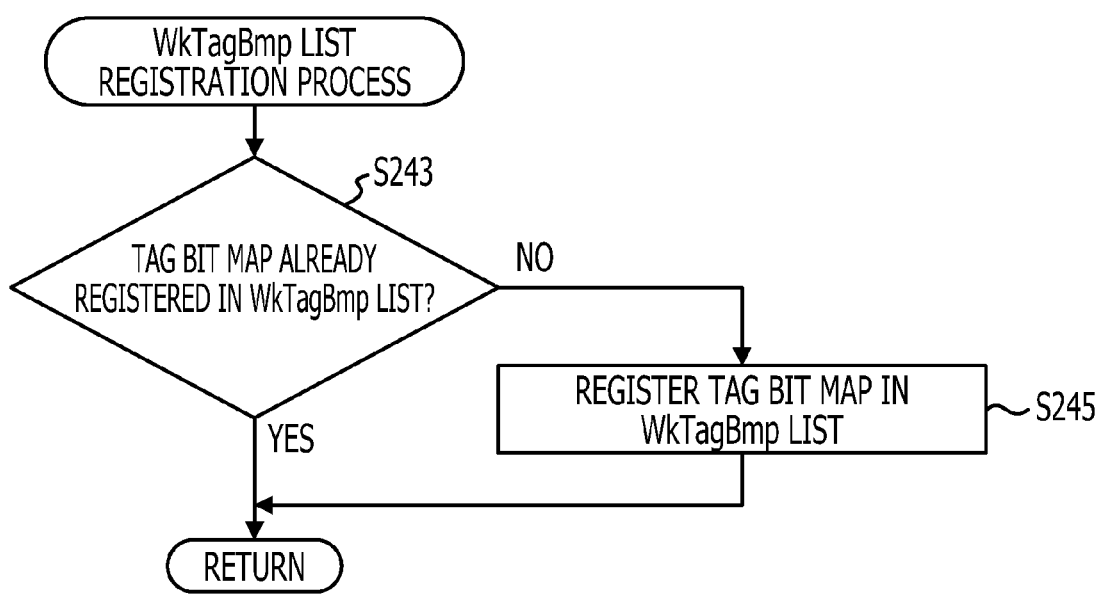
FIG. 41 illustrates an example of a process flow of a WkTagBmp list registration process.

First, the data storage processing unit 136 determines whether or not the tag bit map included in the loaded record is registered in the WkTagBmp list (FIG. 41: S243). If registered, the flow returns to the parent process. In contrast, if unregistered, the data storage processing unit 136 registers the entire tag bit map in the WkTagBmp list (S245). For example, in the case of processing the second through fifth lines in FIG. 31, only the second line is registered in the WkTagBmp list. Herein, a tag bit map registered in the WkTagBmp list is called a WkTagBmp. After that, the flow returns to the parent process.

Returning to FIG. 40, in the case where it is detected in S259 that the loaded record is not the first record and that _ctb=_otb is false, or in other words that the tag bit map (specifically the sort key length portion thereof) differs from the last tag bit map (specifically the sort key length portion thereof), the data storage processing unit 136 determines whether or not buffered records exist in the compression buffer 138 (S261). The data storage processing unit 136 proceeds to S269 in the case where no buffered records exist in the compression buffer 138. In contrast, the data storage processing unit 136 carries out a compression process in the case where buffered records exist in the compression buffer 138 (S263). The compression process will now be described using FIG. 42.

Figure 42:
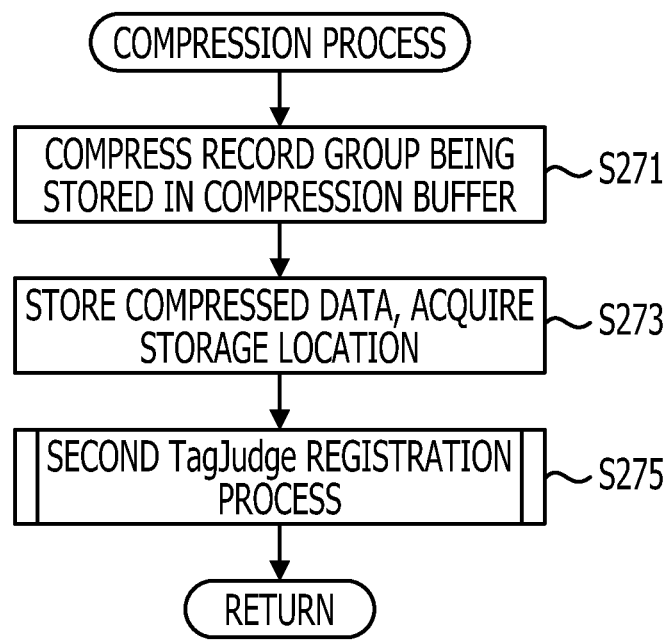
FIG. 42 illustrates an example of a process flow of a compression process.

First, the data storage processing unit 136 compresses the record group being stored in the compression buffer 138 according to a given format to generate a compressed block (FIG. 42: S271). The data storage processing unit 136 then stores the compressed block in the second DB 140, and acquires its storage location in the second DB 140 (S273). These operations are similar to those of the first embodiment.

Additionally, the data storage processing unit 136 carries out a second tag judge (TagJudge) registration process (S275). The second TagJudge registration process will now be described using FIG. 43. Note that once this process is completed, the process returns to the operations in FIG. 40.

As an example, assume that the second through fifth lines in FIG. 31 are being stored in the compression buffer 138, and that the tag bit maps on the second and fifth lines are registered in the WkTagBmp list.

Figure 43:
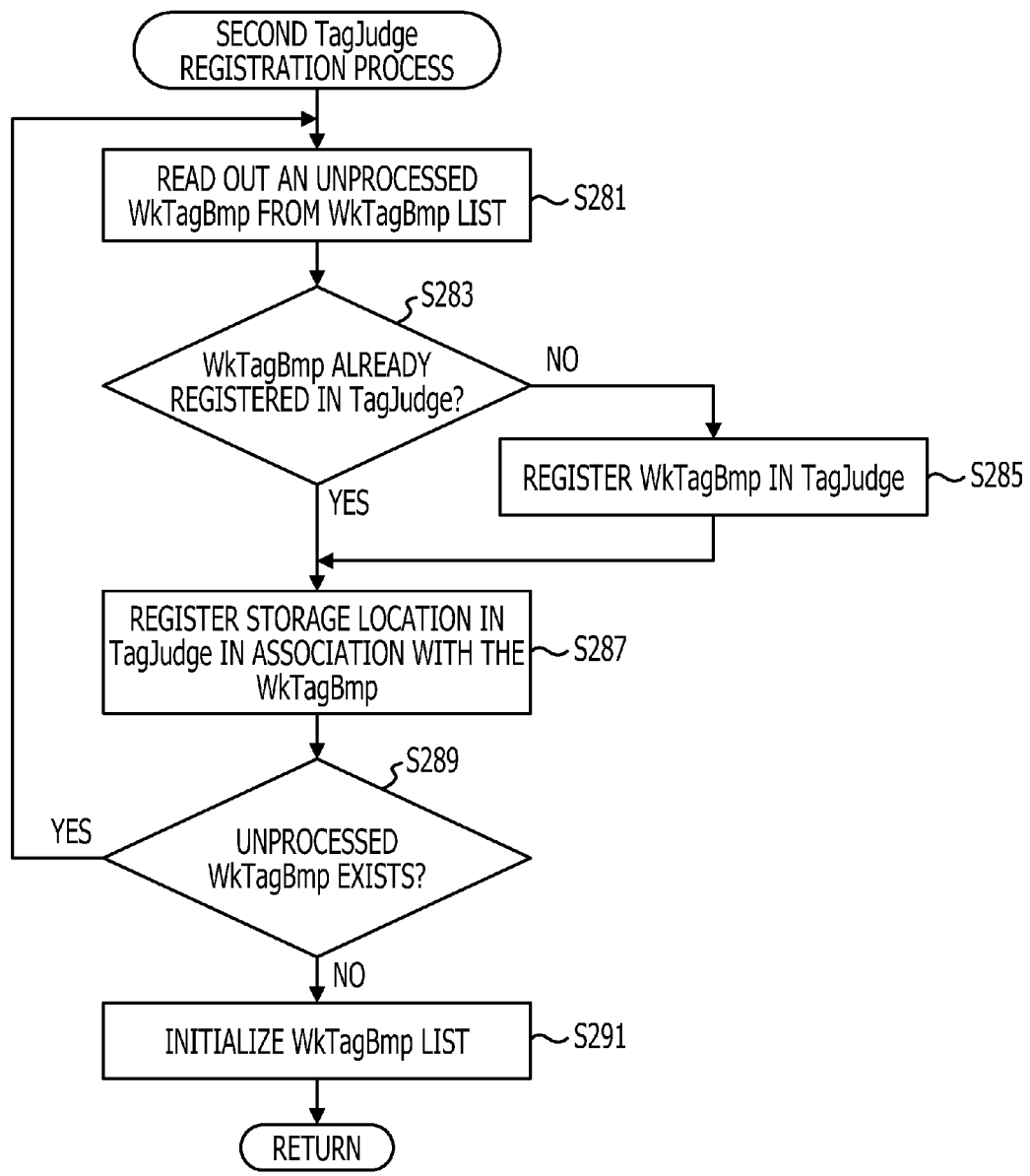
FIG. 43 illustrates an example of a process flow of a second TagJudge registration process.

First, the data storage processing unit 136 reads out an unprocessed WkTagBmp from the WkTagBmp list (FIG. 43: S281). The data storage processing unit 136 then determines whether or not the WkTagBmp is registered in the TagJudge (S283). If unregistered, the data storage processing unit 136 registers the read-out WkTagBmp in the TagJudge (S285). The process then proceeds to S287.

If the WkTagBmp is already registered in the TagJudge or after S285, the data storage processing unit 136 registers the storage location acquired in S273 in association with the corresponding WkTagBmp in the TagJudge in the tag judge storage 137 (S287). At this point, the TagJudge data structure is the same as that illustrated in FIG. 21.

In so doing, it becomes possible to create a data structure for referencing relevant compressed blocks for individual types of WkTagBmp (tag bit maps).

After that, the data storage processing unit 136 determines whether or not any unprocessed WkTagBmp exists in the WkTagBmp list (S289). The process returns to S281 if an unprocessed WkTagBmp exists. In contrast, the data storage processing unit 136 carries out a WkTagBmp list initialization operation if no unprocessed WkTagBmp exists (S291). The flow then returns to the parent process.

Since records corresponding to a plurality of different tag bit maps are buffered in the compression buffer 138, that plurality of different tag bit maps is registered in the WkTagBmp list and reflected in the TagJudge.

Figure 40:
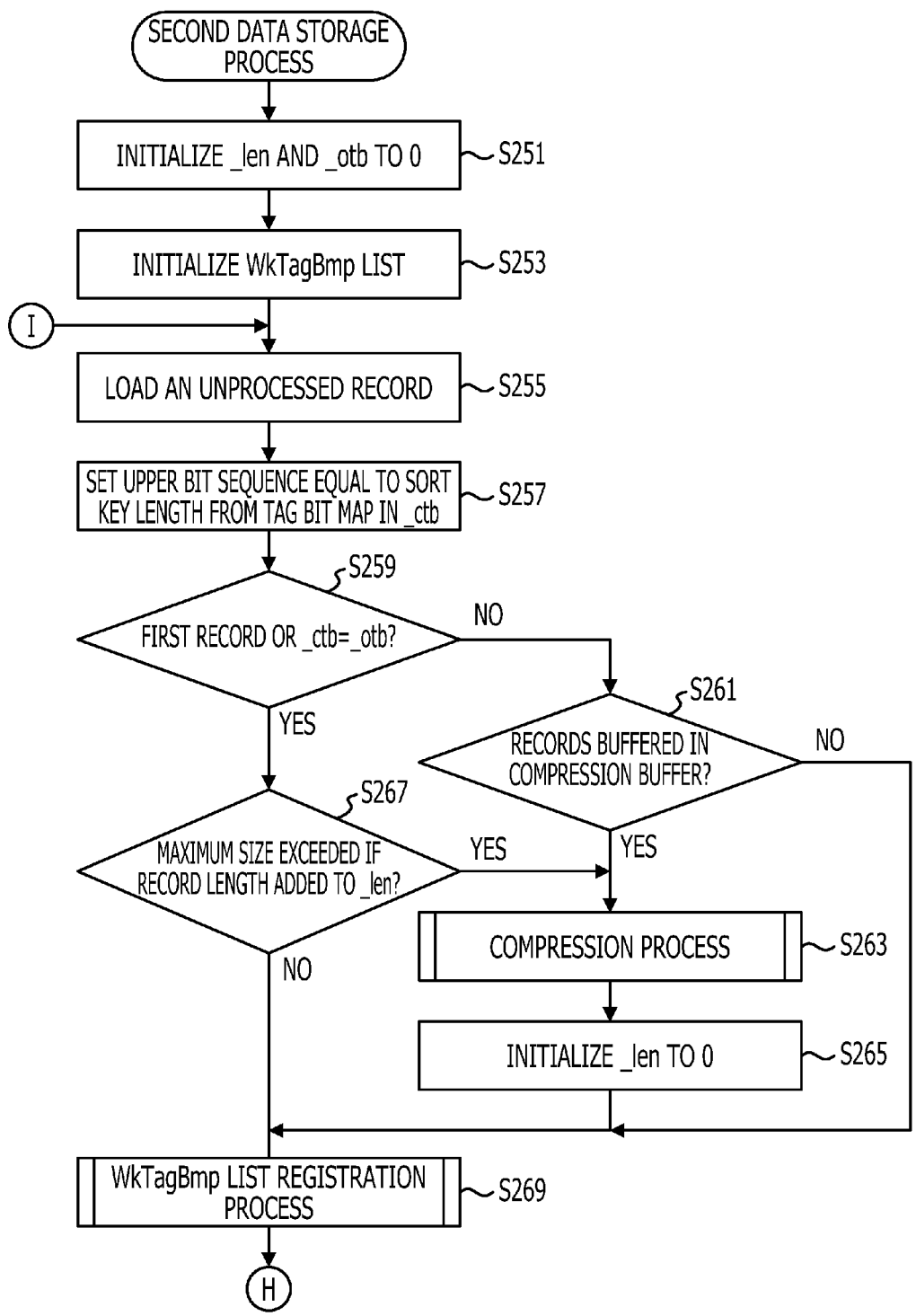
FIG. 40 illustrates an example of a process flow of a second data storage process.

Returning to the operations in FIG. 40 via FIG. 42, the data storage processing unit 136 initializes the variable _len to 0 (S265). The process then proceeds to S269.

Figure 44:
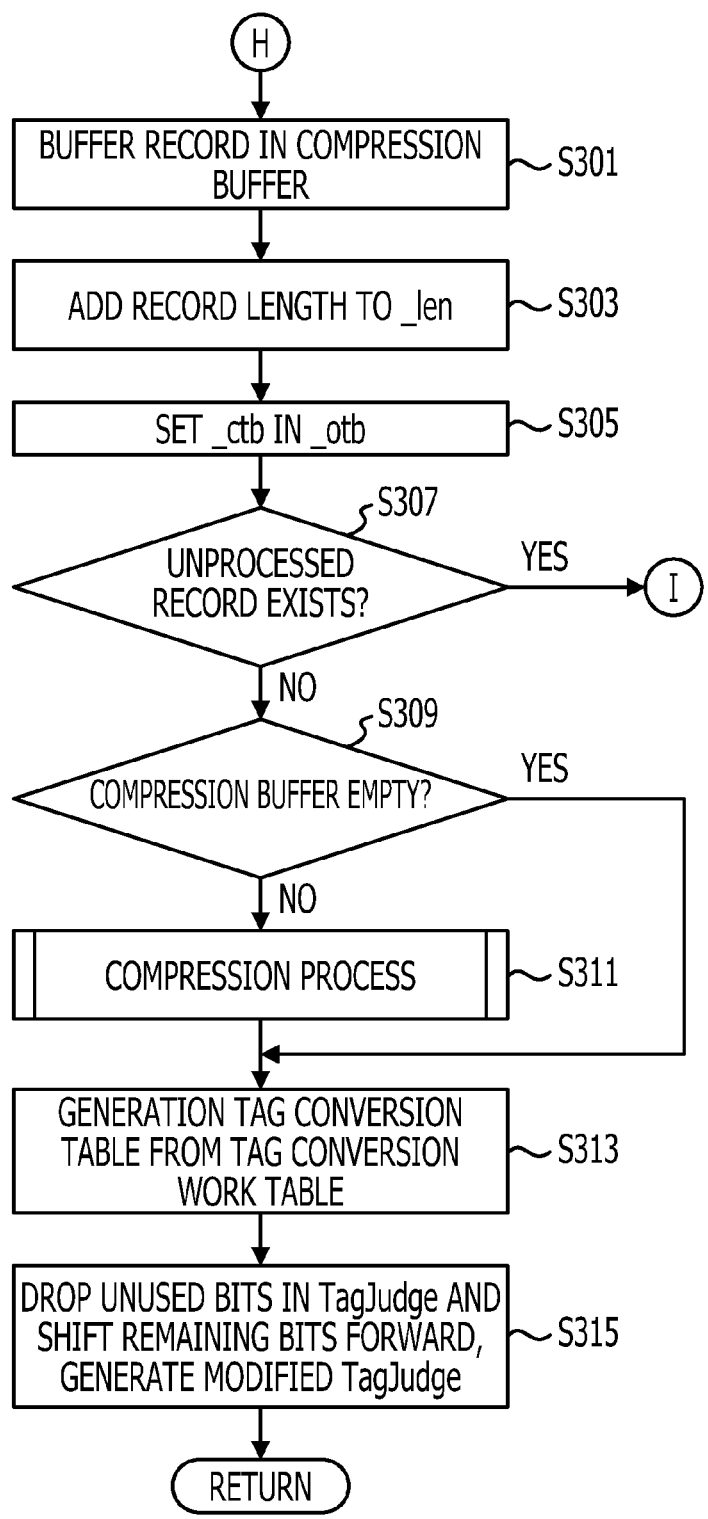
FIG. 44 illustrates an example of a process flow of a second TagJudge registration process.

After the processing in S269, the process proceeds to the operations in FIG. 44.

In FIG. 44, the data storage processing unit 136 buffers the record that was loaded in S255 in the compression buffer 138 (S301). The data storage processing unit 136 then adds the record length of the record stored in the compression buffer 138 to the variable _len (S303). Additionally, the data storage processing unit 136 sets _ctb in the variable _otb (S305).

After that, the data storage processing unit 136 determines whether or not any unprocessed records exist in the sorted record group in the extracted data storage 132 (S307). If an unprocessed record exists, the process returns to S255 in FIG. 40 via the connector I. In the case where no unprocessed records exist, the data storage processing unit 136 determines whether or not the compression buffer 138 is empty (S309). If not empty, the data storage processing unit 136 carries out a compression process (S311). The same process as in S263 is carried out. In so doing, data remaining in the compression buffer 138 can be processed. The process then proceeds to S313. In contrast, the process proceeds to S313 if the compression buffer 138 is empty.

By carrying out such processing, records are compressed and stored in the second DB 140, while in addition, a preliminary TagJudge made up of index structure data used for searches is constructed.

Subsequently, the data storage processing unit 136 generates a tag conversion table from the tag conversion work table being stored in the tag conversion table storage 134 (S313). As illustrated in FIG. 33, entries without a tag name registered in the tag name column are dropped and the remaining rows are shifted upward, and a tag IDa is serially assigned starting from the higher tag IDs. Additionally, a column for registering the reference count is provided. In so doing, a tag conversion table is generated.

Furthermore, since the bit positions corresponding tag IDs without a tag name registered in the tag conversion work table become unused bits in the TagJudge (specifically the tag bit map portion thereof), the data storage processing unit 136 drops the unused bits and shifts the remaining bits forward to generate a modified TagJudge (S315). The flow then returns to the parent process.

By carrying out such processing, a tag conversion table and a TagJudge are completed.

Returning to FIG. 37, the data storage processing unit 136 takes the TagJudge in the tag judge storage 137 and the tag conversion table being stored in the tag conversion table storage 134, and stores them together in the second DB 140. (S211). Data like that illustrated in FIG. 23 is stored in the second DB 140 in addition to files containing compressed blocks. In other words, index structure data which is used for searches which includes a tag conversion table and a TagJudge is stored. However, the structure of the tag conversion table differs from that of the first embodiment. Also, tag bit maps (TagBmp) in the TagJudge have different lengths, since unused bits have been dropped and the remaining bits shifted.

Figure 45:
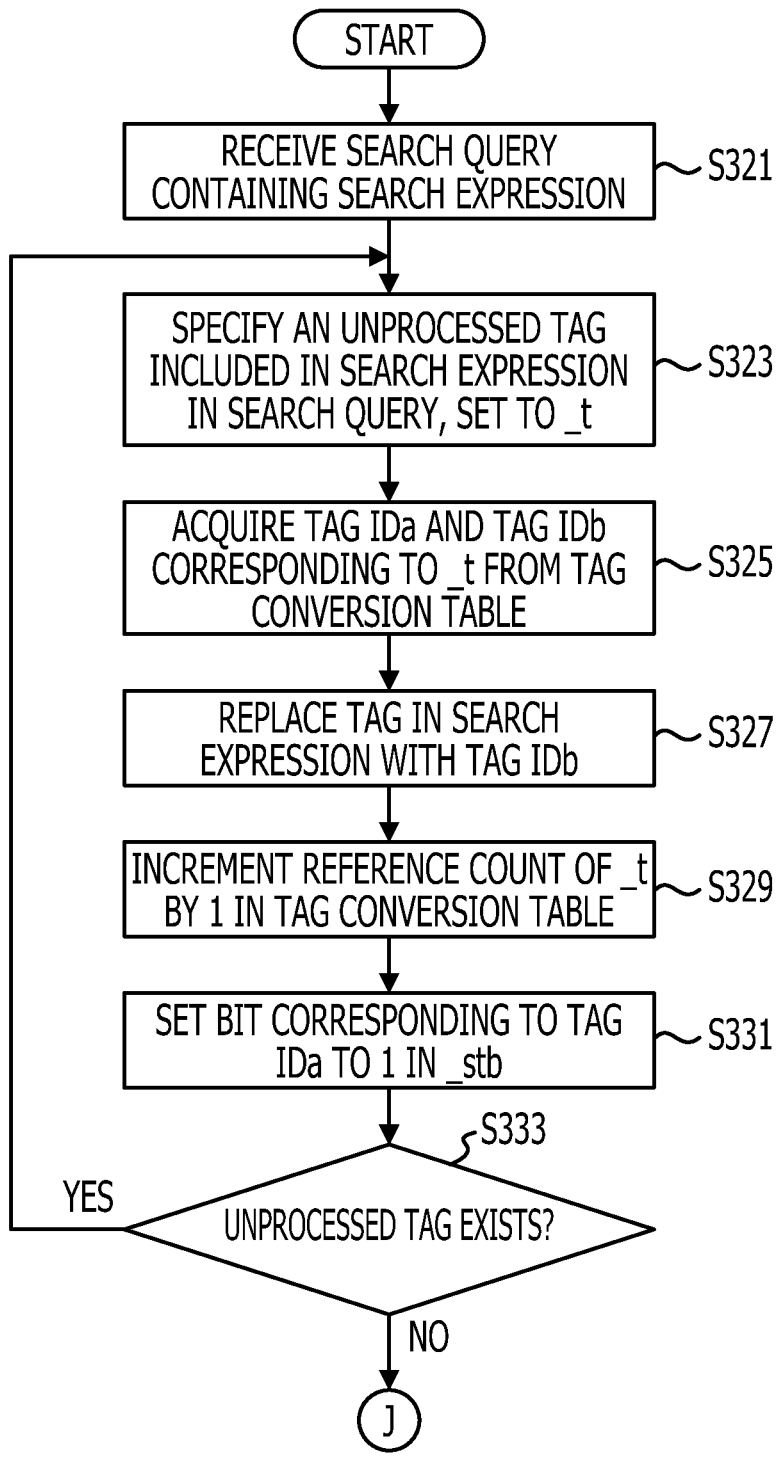
FIG. 45 illustrates an example of a process flow of processing during search according to a second embodiment.

Next, processing during a search will be described using FIGS. 45 and 46. The interface 151 of the search processing unit 150 receives a search query containing a search expression from an analysis system or other source (FIG. 45: S321). The interface 151 then outputs search expression data to the search expression processing unit 152. The search expression processing unit 152 specifies an unprocessed tag included in the search expression from the search query, and sets the specified tag in a variable _t (S323). The search expression processing unit 152 then acquires the tag IDa and the tag IDb corresponding to _t from the tag conversion table stored in the second DB 140 (S325). This is done in order to conduct processing like that illustrated in FIG. 36.

After that, the search expression processing unit 152 replaces the tag in the search expression with the tag IDb (S327). The search expression processing unit 152 also increments the reference count of _t by 1 in the tag conversion table (S329).

In addition, the search expression processing unit 152 sets the bit position corresponding to the tag IDa to the value 1 in a bit map _stb (S331). This operation is done in order to generate a bit map 3101 like that illustrated in FIG. 35.

After that, the search expression processing unit 152 determines whether or not any unprocessed tags exist in the search expression (S333). The process returns to S323 if an unprocessed tag exists. In contrast, in the case where no unprocessed tags exist, the search expression processing unit 152 outputs the bit map _stb to the data extracting unit 153, and outputs the substituted search expression data to the searching unit 155. The process then proceeds to the operations in FIG. 46 via the connector J.

Figure 46:
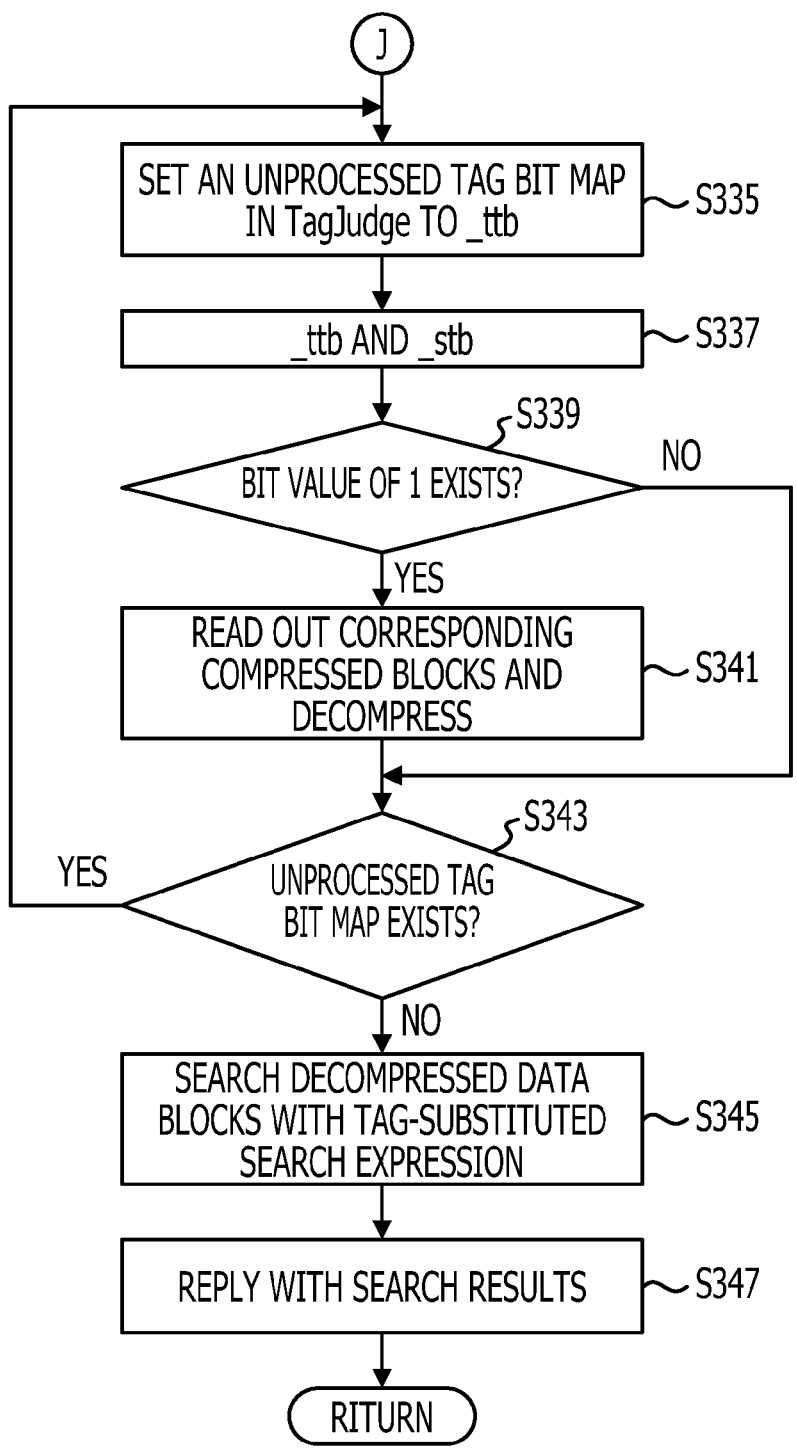
FIG. 46 illustrates an example of a process flow of processing during search according to a second embodiment.

In FIG. 46, the data extracting unit 153 sets an unprocessed tag bit map in the TagJudge stored in the second DB 140 to _ttb (S335). The data extracting unit 153 then performs a bitwise AND on the bit map _stb and the read-out tag bit map _ttb (S337). The data extracting unit 153 then determines if any bit positions are at the value 1 (S339). If all bit positions are at the value 0, this indicates that no report data hits were found for the search expression, and thus the process proceeds to S343.

In contrast, if any bit positions are at the value 1, the data extracting unit 153 reads out the pointers stored in association with the read-out tag bit map, reads out the compressed blocks indicated by the pointers from the second DB 140, carries out a decompression process that is the reverse of the compression process, and stores the decompressed results in the data storage 154 (S341).

After that, the data extracting unit 153 determines whether or not any unprocessed tag bit maps exist in the TagJudge (S343). The process returns to S335 if an unprocessed tag bit map exists in the TagJudge. In contrast, in the case where no unprocessed tag bit maps exist in the TagJudge, the searching unit 155 searches the decompressed data blocks stored in the data storage 154 with the search expression whose tags have been replaced with tag IDs, and extracts report data (i.e., XML documents) satisfying the search expression parameters (S345). If report data satisfying the parameters exists, the searching unit 155 outputs that report data to the interface 151, whereas if such report data does not exist, the searching unit 155 notifies the interface 151 of the null result. The interface 151 transmits the search results as a reply to the analysis system or other apparatus that originally transmitted the search query (S347).

By carrying out processing like the above, original data records are clustered by tag bit map, and thus access is also localized during searches using a tag bit map. Particularly, in the case of archiving data in compressed form, such localization of access acts to decrease the amount of data to decompress, which speeds up response to search queries and reduces the processing load. Moreover, if access can be localized with less used disk space, personnel costs related to disk device management can also be decreased. Furthermore, since a tag conversion table that acts as the basis for the tag bit maps is generated as new tags appear, manual design can be reduced or omitted, and personnel or other costs can be decreased.

Although an example of performing tag compression is illustrated in the embodiment discussed above, tag compression may also be reduced or omitted in some cases. Furthermore, data compression itself may also not be conducted in some cases.

Additionally, formats such as those of the TagJudge and the tag conversion table are not limited to the examples discussed above, and their storage location may be another data storage unit rather than the second DB 140 in some cases.

Also, in the second embodiment, since sorting can be sped up even with many different tags, the processing time of the data storage process can be decreased.

The foregoing thus describes embodiments according to the present technology, but the present technology is not limited thereto. For example, the function block diagrams discussed above are merely examples, and may not strictly match actual program modules in some cases. Moreover, the sequence of operations in the process flows may be changed or executed in parallel, insofar as the processing results remain unchanged.

It may also be configured such the processing illustrated in FIGS. 33 and 34 is omitted in the second embodiment.

Furthermore, although the system illustrated in FIG. 1 may be realized by a single computer, the system may also be realized by a plurality of computers in some cases.

Figure 47:
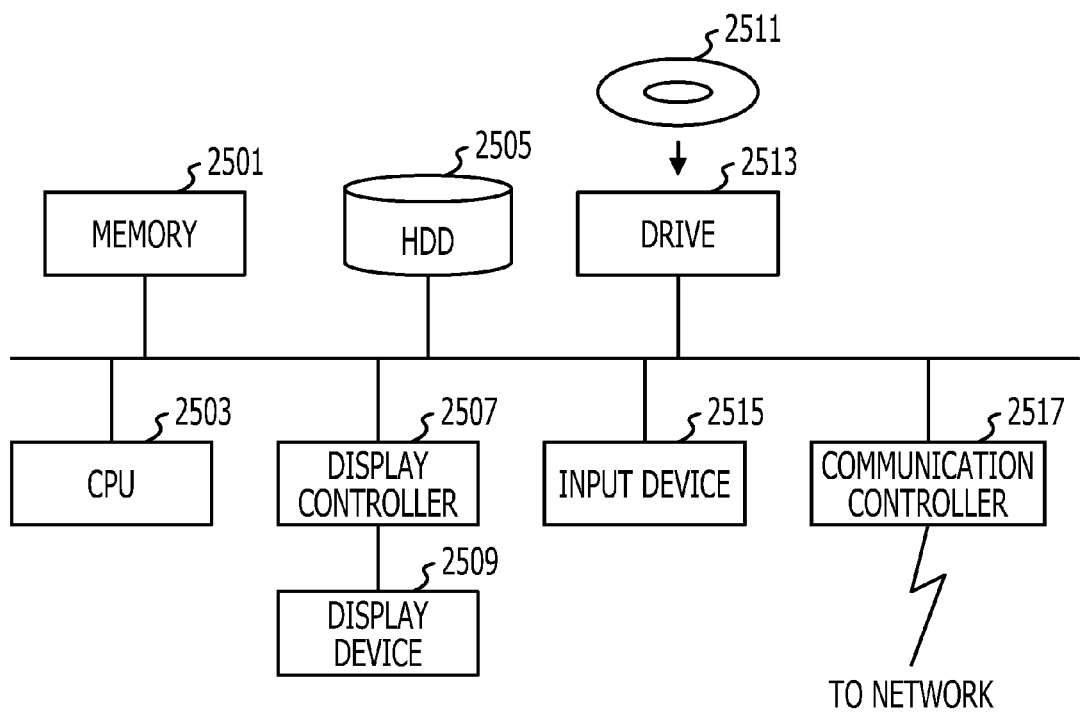
FIG. 47 illustrates an example of a computer hardware configuration.

Herein, the DB management system discussed above may be a computer, in which memory 2501, a central processing unit (CPU) 2503, a hard disk drive (HDD) 2505, a display controller 2507 connected to a display device 2509, a drive 2513 for a removable medium 2511, an input device 2515, and a communication controller 2517 for connecting to a network are connected by a bus 2519, as illustrated in FIG. 47. An operating system (OS) and an application program for carrying out the processing, which is performed by the record managing unit 110, the data migration unit 130, and the search processing unit 150, in the embodiments are stored in the HDD 2505, and read out from the HDD 2505 to the memory 2501 at the time of execution by the CPU 2503. The CPU 2503 causes given operation to be conducted by controlling the display controller 2507, the communication controller 2517, and the drive 2513 according to the processing operations of the application program. Also, although data being processed is primarily stored in the memory 2501, it may also be configured such that data being processed is stored in the HDD 2505. In an embodiment of the present technology, the application program for carrying out the processing discussed earlier is distributed stored on a computer-readable removable medium 2511, and installed from the drive 2513 to the HDD 2505. In some cases, the application program may be installed to the HDD 2505 via the communication controller 2517 and a network such as the Internet. In such a computer, various functions as discussed earlier are realized by organic cooperation between hardware such as the CPU 2503 and the memory 2501 and programs such as the OS and the application program.

An information processing method according to a first aspect of an embodiment includes (A) a first operation of extracting, from a plurality of data blocks to be stored, one or more tags included in each of the plurality of data blocks, and generating bit sequences in which bit positions corresponding to the types of tags are toggled on, (B) a second operation of categorizing the plurality of bit sequences generated for the plurality of data blocks into a plurality of groups on the basis of fully- or partially-matching bit sequences, and (C) a third operation of taking the data of data blocks corresponding to a bit sequence belonging to a particular group from among the plurality of groups, and storing the data in data storage in association with the bit sequence type belonging to that group.

In this way, data blocks are characterized by bit sequences expressing types of tags appearing in those data blocks, and the data blocks are grouped (or clustered) on the basis of the bit sequences and stored in data storage in association with the bit sequence type. In so doing, it becomes possible to efficiently read out appropriate data blocks during tag base searches.

In the first operation discussed above, it may also be configured such that in the case where a new tag is extracted from a data block, an unused identification number is assigned to that tag, and the tag is stored in second data storage in association with the identification number assigned to that tag. In this case, bit positions are associated with identification numbers. In so doing, bit sequence generation rules are automatically generated according to the data blocks to be stored, and thus the system can continue to operate without manual modifications even if there is a change in the types of data blocks to be stored.

Furthermore, the first operation discussed above may also be configured to include an operation such that, in the case where a tag extracted from a data block is a tag stored in the second data storage and also not included in first correspondence data which associates tags with identification numbers for those tags and which is generated according to tag search usage frequency, an unused identification number is assigned to that tag, and correspondence data associating that tag with its assigned identification number is stored in the second data storage. In so doing, it also becomes possible to assign higher-order bits in a bit sequence to tags with higher search usage frequency. Thus, even if grouping is conducted by looking at just a portion of the higher-order bits in bit sequences, for example, decreases in search efficiency can be minimized.

Also, the second operation discussed above may be configured to include an operation of sorting a plurality of bit sequences by the bit length of the bit sequences or by a second bit length that is shorter than the bit length and predetermined. Such an operation may be carried out for the categorizing operation in some cases.

Furthermore, the third operation discussed above may also be configured to include an operation of compressing data blocks corresponding to a bit sequence belonging to a group or data blocks in which the tags included in those data blocks have been replaced with the identification numbers of those tags. By compressing in this way, the amount of used disk space can be decreased.

An information processing method according to a second aspect of an embodiment includes (A) a first operation of receiving a search query requesting a search for one or more specified tags, (B) a second operation of identifying identification numbers corresponding to the one or more specified tags, and generating a bit sequence in which the bit positions corresponding to the specified identification numbers are toggled on, (C) a third operation of identifying bit sequences in which at least one bit position that was toggled on in the generated bit sequence is toggled on, the bit sequences existing in second correspondence data which associates bit sequences with data in data blocks that include tags associated with identification numbers corresponding to bit positions toggled on in the bit sequences, and reading out one or more data blocks associated with the identified bit sequences from data storage that stores a plurality of data blocks, and (D) a fourth operation of searching the read-out data blocks in accordance with the search query.

In so doing, it becomes possible to efficiently read out data blocks containing tags included in a search query.

In the information processing method according to a second aspect of an embodiment, the search usage frequency of individual tags may be managed in relation to first correspondence data in some cases. In such cases, the information processing method may also be configured to additionally include an operation of increasing the search usage frequency for a specified tag. In so doing, it becomes possible to generate first correspondence data and second correspondence data so as to match the state of searches.

Figure 48:
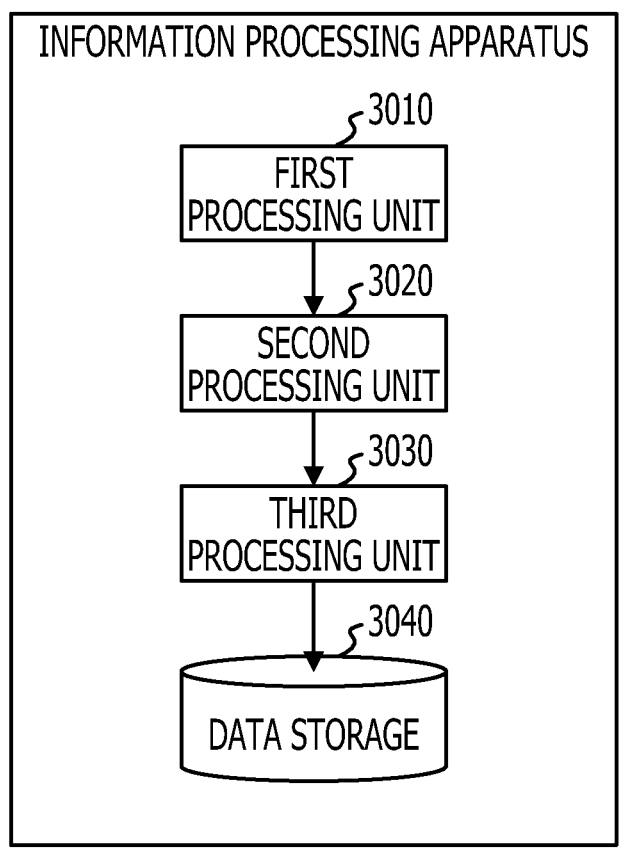
FIG. 48 illustrates an example of function blocks of an information processing apparatus for data storage processing according to an embodiment.

Furthermore, an information processing apparatus (FIG. 48) according to a third aspect of an embodiment includes (A) a first processing unit 3010 that extracts, from a plurality of data blocks to be stored, one or more tags included in each of the plurality of data blocks, and generates bit sequences in which bit positions corresponding to the types of tags are toggled on, (B) a second processing unit 3020 that categorizes the plurality of bit sequences generated for the plurality of data blocks into a plurality of groups on the basis of fully- or partially-matching bit sequences, and (C) a third processing unit 3030 that takes the data of data blocks corresponding to a bit sequence belonging to a particular group from among the plurality of groups, and stores the data in data storage 3040 in association with the bit sequence type belonging to that group.

Figure 49:
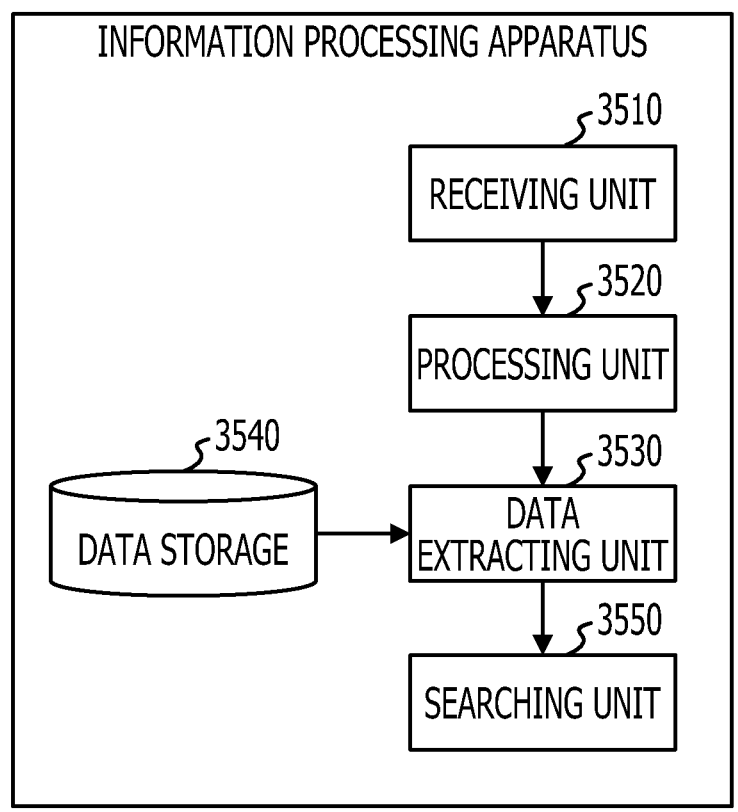
FIG. 49 illustrates an example of function blocks of an information processing apparatus for search processing according to an embodiment.

Also, an information processing apparatus (FIG. 49) according to a fourth aspect of an embodiment includes (A) a receiving unit 3510 that receives a search query requesting a search for one or more specified tags, (B) a processing unit 3520 that identifies identification numbers corresponding to the one or more specified tags, and generates a bit sequence in which the bit positions corresponding to the specified identification numbers are toggled on, (C) a data extracting unit 3530 that identifies bit sequences in which at least one bit position that was toggled on in the generated bit sequence is toggled on, the bit sequences existing in second correspondence data which associates bit sequences with data in data blocks that include tags associated with identification numbers corresponding to bit positions toggled on in the bit sequences, and reads out one or more data blocks associated with the identified bit sequences from data storage 3540 that stores a plurality of data blocks, and (D) a searching unit 3550 that searches the read-out data blocks in accordance with the search query.

Furthermore, it is possible to create a program for causing a computer to carry out processing like that discussed above. Such a program may be stored in a computer-readable storage medium or storage device such as a flexible disk, a CD-ROM or other optical disc, a magneto-optical disc, semiconductor memory (ROM, for example), or a hard disk, for example. Meanwhile, data being processed may be temporarily retained in a storage device such as RAM.

According to an aspect of the above disclosure, it is possible to efficiently search a plurality of data blocks containing one or a plurality of individual tags.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a data management program that causes a computer to execute a procedure, the computer including a memory configured to store conversion information including a plurality of tags and a plurality of tag identifiers, each of the plurality of tags being associated with one of the plurality of tag identifiers, the procedure comprising:

generating, from a plurality of XML (extensible markup language) documents, a plurality of compressed documents by replacing each of one or more tags included in the plurality of XML documents with a tag identifier corresponding to each of the one or more tags, by using the conversion information;

generating, for each of the plurality of compressed documents, a bit sequence indicating whether each of the plurality of tag identifiers is included in the compressed document;

generating a compressed data by compressing one or more XML documents together, the one or more XML documents corresponding to an identical bit sequence among the plurality of bit sequences;

storing the generated compressed data;

concatenating each of the plurality of bit sequences with one of data records;

sorting the plurality of bit sequences;

classifying the plurality of bit sequences into a plurality of groups by grouping one or more identical bit sequences among the plurality of bit sequences;

searching the memory for frequency information indicating a search usage frequency for each of the one or more tags;

storing the frequency information indicating a search usage frequency for each of the one or more tags; and extracting, based on the frequency information, one or more bit sequences respectively corresponding a tag with higher search usage frequency, wherein the grouping includes grouping the one or more extracted bit sequences based on higher order bits included in the extracted one or more bit sequences.

2. The recording medium according to claim 1, wherein each bit position of the plurality of bit sequences corresponds to a type of one of the one or more tags in the plurality of XML documents.

3. The recording medium according to claim 2, wherein each bit included in one of the plurality of bit sequences indicates whether or not a tag, which is the one of the plurality of tags, is included in an XML document corresponding to the one of the bit sequences.

4. The recording medium according to claim 3, wherein one or more bits of each of the bit sequences have same value.

5. The recording medium according to claim 3, the procedure further comprising:

in the case where a second XML document, which is different from the plurality of XML documents, including an additional tag not included in the plurality of XML documents is input, generating a bit sequence which indicates whether the one or more tags is included in the second data or not, and indicates that the additional tag is included in the second XML documents.

6. The recording medium according to claim 2, wherein a number of bit positions of the bit sequence being set to a predetermined fixed length according to a number of types of one or more tags included in the plurality of XML documents.

7. The recording medium according to claim 1, further comprising generating a document structure index for handling search queries from analysis systems or other sources, the document structure index including a plurality of pointers respectively corresponding to one of types of the generated bit sequences.

8. The recording medium according to claim 1, further comprising when a new tag is extracted from one of the plurality of XML documents, assigning an unused tag identifier to the new tag, and updating the conversion information by storing a combination of the new tag and the unused tag identifier.

9. A data management method executed by a processor included in a data management apparatus, the data management apparatus including a memory configured to store conversion information including a plurality of tags and a plurality of tag identifiers, each of the plurality of tags being associated with one of the plurality of tag identifiers, the data management method comprising:

generating, from a plurality of XML (extensible markup language) documents, a plurality of compressed documents by replacing each of one or more tags included in the plurality of XML documents with a tag identifier corresponding to each of the one or more tags, by using the conversion information;

generating, for each of the plurality of compressed documents, a bit sequence indicating whether each of the plurality of tag identifiers is included in the compressed document;

generating a compressed data by compressing one or more XML documents together, the one or more XML documents corresponding to an identical bit sequence among the plurality of bit sequences;

storing the generated compressed data;

concatenating each of the plurality of bit sequences with one of data records;

sorting the plurality of bit sequences;

classifying the plurality of bit sequences into a plurality of groups by grouping one or more identical bit sequences among the plurality of bit sequences;

searching the memory for frequency information indicating a search usage frequency for each of the one or more tags;

storing frequency information indicating a search usage frequency for each of the one or more tags; and extracting one or more bit sequences respectively corresponding a tag with higher search usage frequency, based on the frequency information, wherein the grouping includes grouping the one or more extracted bit sequences based on higher order bits included in the extracted one or more bit sequences.

10. A data management apparatus comprising:

a storage device;

a memory configured to store conversion information including a plurality of tags and a plurality of tag identifiers, each of the plurality of tags being associated with one of the plurality of tag identifiers; and a processor that executes a procedure, the procedure including:

generating, from a plurality of XML (extensible markup language) documents, a plurality of compressed documents by replacing each of one or more tags included in the plurality of XML documents with a tag identifier corresponding to each of the one or more tags, by using the conversion information, generating, for each of the plurality of compressed documents, a bit sequence indicating whether each of the plurality of tag identifiers is included in the compressed document, generating a compressed data by compressing one or more XML documents together, the one or more XML documents corresponding to an identical bit sequence among the plurality of bit sequences, storing the generated compressed data, concatenating each of the plurality of bit sequences with one of data records, sorting the plurality of bit sequences, classifying the plurality of bit sequences into a plurality of groups by grouping one or more identical bit sequences among the plurality of bit sequences, searching the memory for frequency information indicating a search usage frequency for each of the one or more tags, storing frequency information indicating a search usage frequency for each of the one or more tags, and extracting one or more bit sequences respectively corresponding a tag with higher search usage frequency, based on the frequency information, wherein the grouping includes grouping the one or more extracted bit sequences based on higher order bits included in the extracted one or more bit sequences.

\* \* \* \* \*